(12) United States Patent
Soneda et al.

(10) Patent No.: US 10,536,668 B2
(45) Date of Patent: Jan. 14, 2020

(54) COMMUNICATION TERMINAL, IMAGE COMMUNICATION SYSTEM, DISPLAY CONTROL METHOD, AND NON-TRANSITORY COMPUTER-READABLE MEDIUM

(71) Applicant: Ricoh Company, Ltd., Tokyo (JP)

(72) Inventors: Takuya Soneda, Kanagawa (JP); Kenichiro Morita, Tokyo (JP); Takeshi Homma, Kanagawa (JP); Mayu Hakata, Kanagawa (JP); Yohhei Ohmura, Kanagawa (JP); Hiroyuki Kanda, Kanagawa (JP); Takafumi Takeda, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/131,373

(22) Filed: Sep. 14, 2018

(65) Prior Publication Data
US 2019/0098253 A1 Mar. 28, 2019

(30) Foreign Application Priority Data
Sep. 25, 2017 (JP) .................................. 2017-184222

(51) Int. Cl.
*H04N 7/14* (2006.01)
*H04N 7/15* (2006.01)
*H04N 5/445* (2011.01)

(52) U.S. Cl.
CPC .............. *H04N 7/147* (2013.01); *H04N 7/15* (2013.01); *H04N 5/44591* (2013.01)

(58) Field of Classification Search
USPC ...................................................... 348/14.07
See application file for complete search history.

(56) References Cited

U.S. PATENT DOCUMENTS

| 6,285,392 B1 * | 9/2001 | Satoda ................... | H04N 7/142 348/14.08 |
| 2004/0201677 A1 * | 10/2004 | Bronson .......... | G08B 13/19663 348/207.1 |

(Continued)

FOREIGN PATENT DOCUMENTS

| JP | 2006-005415 | 1/2006 |
| JP | 2011-223076 | 11/2011 |

(Continued)

*Primary Examiner* — Amal S Zenati
(74) *Attorney, Agent, or Firm* — Xsensus LLP

(57) ABSTRACT

A communication terminal for displaying a predetermined-area image includes circuitry. The circuitry receives first predetermined-area information indicating a first predetermined area, the first predetermined-area information being transmitted from another communication terminal displaying a first predetermined-area image. The circuitry calculates a direction of the first predetermined area with respect to a second predetermined area in a whole image, based on the first predetermined-area information and second predetermined-area information. The second predetermined area is an area of a second predetermined-area image being displayed by the communication terminal. The circuitry controls a display to display the second predetermined-area image including display direction information indicating the calculated direction. The circuitry accepts designation of the display direction information. The circuitry controls the display to display the first predetermined-area image based on the first predetermined-area information, which is a source of calculation of the display direction information for which the designation is accepted.

20 Claims, 34 Drawing Sheets

(56) References Cited

U.S. PATENT DOCUMENTS

| | | | | |
|---|---|---|---|---|
| 2004/0223191 A1* | 11/2004 | Murata | ................ | H04N 5/232 |
| | | | | 358/451 |
| 2014/0184821 A1* | 7/2014 | Taneichi | ................ | H04N 5/765 |
| | | | | 348/207.1 |
| 2018/0097682 A1 | 4/2018 | Yoshida et al. | | |
| 2018/0098105 A1 | 4/2018 | Morita et al. | | |
| 2018/0191787 A1 | 7/2018 | Morita et al. | | |
| 2018/0227457 A1 | 8/2018 | Morita et al. | | |

FOREIGN PATENT DOCUMENTS

| | | |
|---|---|---|
| JP | 2012-178135 | 9/2012 |
| JP | 2014-204411 | 10/2014 |

* cited by examiner

FIG. 16

IMAGE TYPE MANAGEMENT TABLE

| IMAGE DATA ID | IP ADDRESS OF SENDER TERMINAL | SOURCE NAME (IMAGE TYPE INFORMATION) |
|---|---|---|
| RS001 | 1.2.1.3 | Video_Theta |
| RS002 | 1.2.2.3 | Video_Theta |
| RS003 | 1.3.1.3 | Video |
| RS004 | 1.3.2.3 | Video |

FIG. 17

IMAGE CAPTURING DEVICE MANAGEMENT TABLE

| VENDER ID AND PRODUCT ID OF GUID OF IMAGE CAPTURING DEVICE |
|---|
| vid_05ca&pid_2711 |
| vid_05ca&pid_3822 |
| ... |

FIG. 18

PREDETERMINED-AREA MANAGEMENT TABLE

| IP ADDRESS OF SENDER TERMINAL THAT SENDS IMAGE DATA | IP ADDRESS OF DESTINATION TERMINAL THAT RECEIVES IMAGE DATA (IP ADDRESS OF SENDER TERMINAL THAT SENDS PREDETERMINED-AREA INFORMATION) | PREDETERMINED-AREA INFORMATION | | |
|---|---|---|---|---|
| | | MOVING RADIUS ($r$) | POLAR ANGLE ($\theta$) | AZIMUTH ($\phi$) |
| 1.2.1.3 | 1.2.2.3 | 10 | 20 | 30 |
| 1.2.1.3 | 1.3.1.3 | 20 | 30 | 40 |
| 1.2.1.3 | 1.3.2.3 | 30 | 40 | 50 |
| 1.2.2.3 | 1.2.1.3 | ... | ... | ... |
| 1.2.2.3 | 1.3.1.3 | ... | ... | ... |
| 1.2.2.3 | 1.3.2.3 | ... | ... | ... |

FIG. 19

SESSION MANAGEMENT TABLE

| SESSION ID | IP ADDRESS OF PARTICIPATING TERMINAL |
|---|---|
| se101 | 1.2.1.3, 1.2.2.3, 1.3.1.3 |
| se102 | 1.2.1.3, 1.2.2.3, 1.3.1.3 |
| ... | ... |

FIG. 20

IMAGE TYPE MANAGEMENT TABLE

| SESSION ID | IMAGE DATA ID | IP ADDRESS OF SENDER TERMINAL | SOURCE NAME (IMAGE TYPE INFORMATION) |
|---|---|---|---|
| se101 | RS001 | 1.2.1.3 | Video_Theta |
| se101 | RS002 | 1.2.2.3 | Video |
| se101 | RS003 | 1.3.1.3 | Video_Theta |
| se102 | RS004 | 1.2.1.4 | Video |
| se102 | RS005 | 1.3.1.4 | Video_Theta |
| ... | ... | ... | ... |

FIG. 21

PREDETERMINED-AREA MANAGEMENT TABLE

| IP ADDRESS OF SENDER TERMINAL THAT SENDS IMAGE DATA | IP ADDRESS OF DESTINATION TERMINAL THAT RECEIVES IMAGE DATA | PREDETERMINED-AREA INFORMATION | | |
|---|---|---|---|---|
| | | MOVING RADIUS ($r$) | POLAR ANGLE ($\theta$) | AZIMUTH ($\phi$) |
| 1.2.1.3 | 1.2.2.3 | 10 | 20 | 30 |
| 1.2.1.3 | 1.2.2.3 | 20 | 30 | 40 |
| 1.2.1.3 | 1.2.2.3 | ... | ... | ... |
| 1.2.2.3 | 1.2.1.3 | ... | ... | ... |
| 1.2.2.3 | 1.2.1.3 | ... | ... | ... |
| ... | ... | | | |

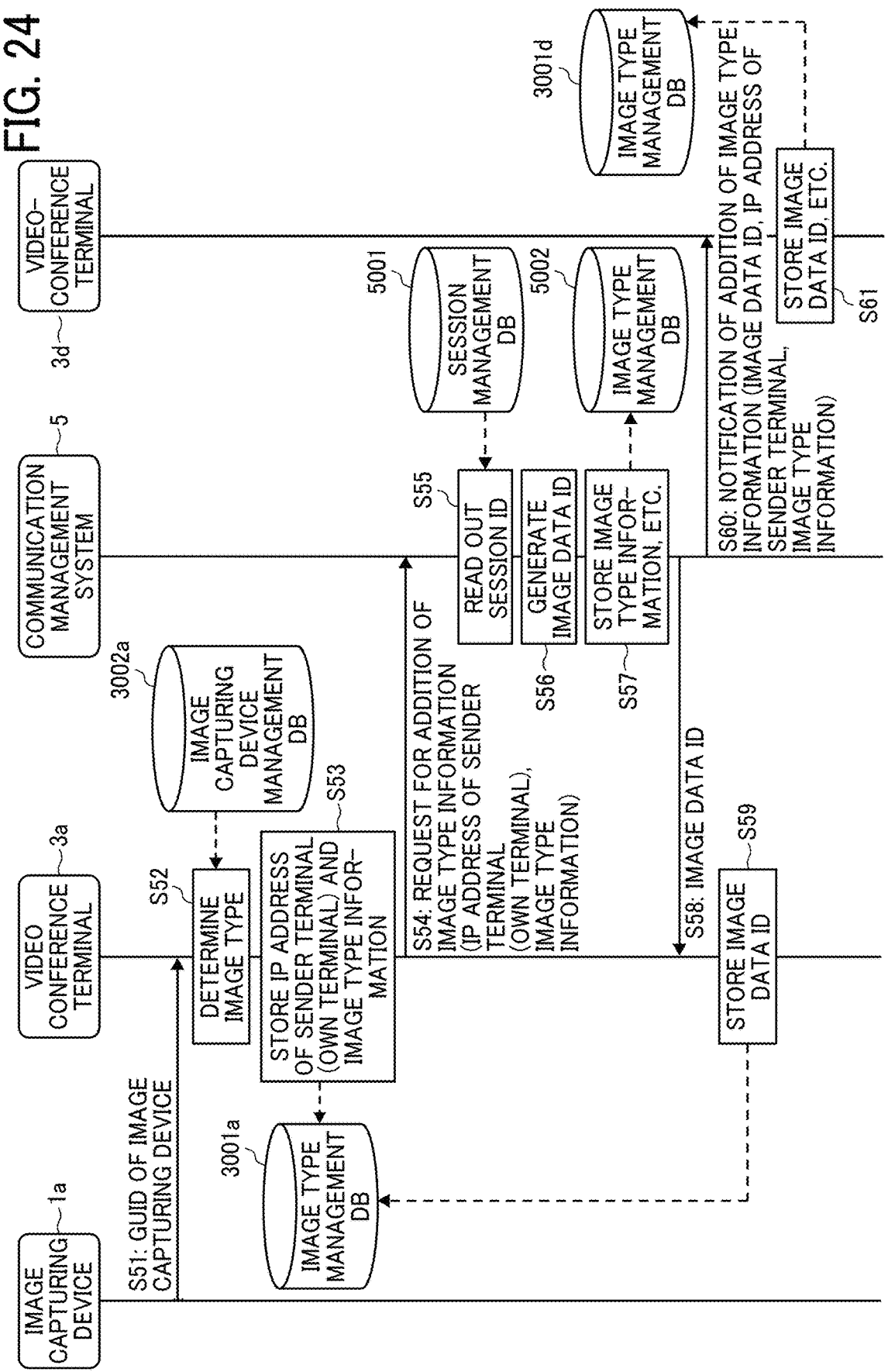

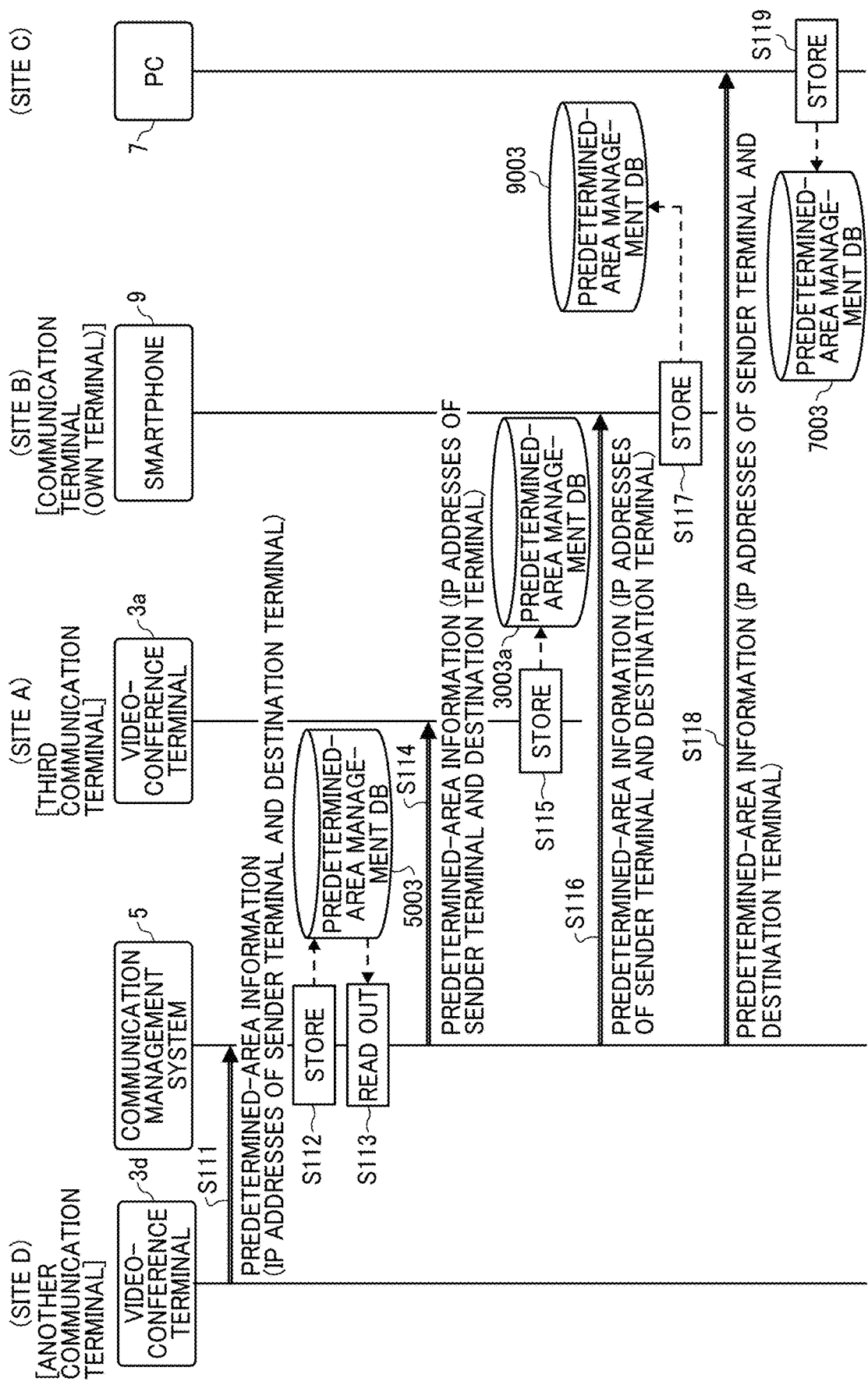

COMMUNICATION TERMINAL, IMAGE COMMUNICATION SYSTEM, DISPLAY CONTROL METHOD, AND NON-TRANSITORY COMPUTER-READABLE MEDIUM

CROSS-REFERENCE TO RELATED APPLICATION

This patent application is based on and claims priority pursuant to 35 U.S.C. § 119(a) to Japanese Patent Application No. 2017-184222, filed on Sep. 25, 2017, in the Japan Patent Office, the entire disclosure of which is hereby incorporated by reference herein.

BACKGROUND

Technical Field

The present disclosure relates to a communication terminal, an image communication system, a display control method, and a non-transitory computer-readable medium.

Description of the Related Art

Videoconference systems are now in widespread use, allowing users at remote places to hold a remote conference via a communication network such as the Internet. In such videoconference systems, a communication terminal for a videoconference system is provided in a meeting room where attendants of one party in a remote conference are attending. This communication terminal collects an image or video of the meeting room including the attendants and sound such as speech made by the attendants, and transmits digital data converted from the collected image (video) and/or sound to the other party's communication terminal provided at a different meeting room. Based on the transmitted digital data, the other party's communication terminal displays images on a display or outputs audio from a speaker in the different meeting room to establish video communication (video calling). This enables to carry out a conference among remote sites, in a state close to an actual conference.

SUMMARY

A communication terminal for displaying a predetermined-area image, which is an image of a part of a whole image, the communication terminal includes circuitry. The circuitry receives first predetermined-area information indicating a first predetermined area, the first predetermined-area information being transmitted from another communication terminal displaying a first predetermined-area image, which is an image of the first predetermined-area in the whole image. The circuitry calculates a direction of the first predetermined area with respect to a second predetermined area in the whole image, based on the first predetermined-area information received and second predetermined-area information indicating the second predetermined area, the second predetermined area being an area of a second predetermined-area image being displayed by the communication terminal. The circuitry controls a display to display the second predetermined-area image including display direction information indicating the calculated direction. The circuitry accepts designation of the display direction information. The circuitry controls the display to display the first predetermined-area image based on the first predetermined-area information, which is a source of calculation of the display direction information for which the designation is accepted.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIG. 16 is a conceptual diagram illustrating an image type management table, according to an embodiment of the present disclosure;

FIG. 17 is a conceptual diagram illustrating an image capturing device management table, according to an embodiment of the present disclosure;

FIG. 18 is a conceptual diagram illustrating a predetermined-area management table, according to an embodiment of the present disclosure;

FIG. 19 is a conceptual diagram illustrating a session management table, according to an embodiment of the present disclosure;

FIG. 20 is a conceptual diagram illustrating an image type management table, according to an embodiment of the present disclosure;

FIG. 21 is a conceptual diagram illustrating a predetermined-area management table, according to an embodiment of the present disclosure;

FIG. 24 is a sequence diagram illustrating an operation of managing image type information, according to an embodiment of the present disclosure;

FIG. 28 is a sequence diagram illustrating an operation of sharing the predetermined-area information, according to an embodiment of the present disclosure;

Figure 1C:
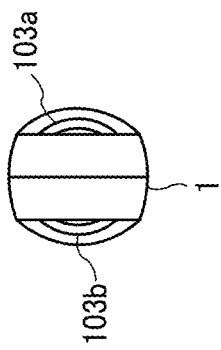
FIG. 1C is a plan view of the image capturing device of FIG. 1A.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the multiple forms as well, unless the context clearly indicates otherwise.

Hereinafter, a description is given of several embodiments of the present disclosure, with reference to drawings.

First Embodiment

First, referring to FIGS. 1A to 1C to FIG. 32, a first embodiment is described.

<Overview of Embodiment>
<Generation of Spherical Panoramic Image>

Referring to FIGS. 1A to 1C to FIG. 7, a description is given of generating a spherical panoramic image.

Figure 1B:
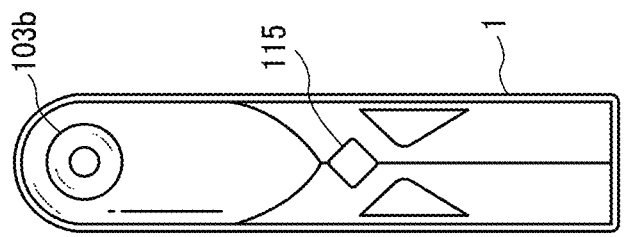
FIG. 1B is a front view of the image capturing device of FIG. 1A.
Figure 1A:
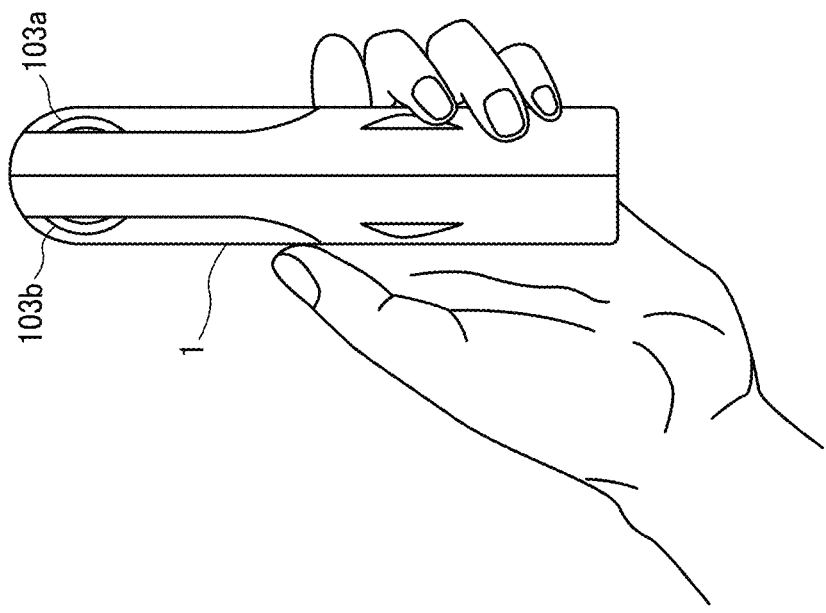
FIG. 1A is a left side view of an image capturing device according to an embodiment of the present disclosure.

First, a description is given of an external view of an image capturing device 1, with reference to FIGS. 1A to 1C. The image capturing device 1 is a digital camera for capturing images from which a spherical image is generated. In one example, the spherical image captured by the image capturing device 1 is a 360-degree spherical panoramic image. FIGS. 1A to 1C are respectively a left side view, a front view, and a plan view of the image capturing device 1.

As illustrated in FIG. 1A, the image capturing device 1 has a shape such that one can hold it with one hand. Further, as illustrated in FIGS. 1A, 1B, and 1C, an imaging element 103a is provided on a front side (anterior side) of an upper section of the image capturing device 1, and an imaging element 103b is provided on a back side (rear side) thereof. These imaging elements (image sensors) 103a and 103b are used in combination with optical members (e.g., fisheye lenses 102a and 102b, described below), each being configured to capture a hemispherical image having an angle of view of 180 degrees or wider. As illustrated in FIG. 1B, the image capturing device 1 further includes an operation unit 115 such as a shutter button on the rear side of the image capturing device 1, which is opposite of the front side of the image capturing device 1.

Figure 2:
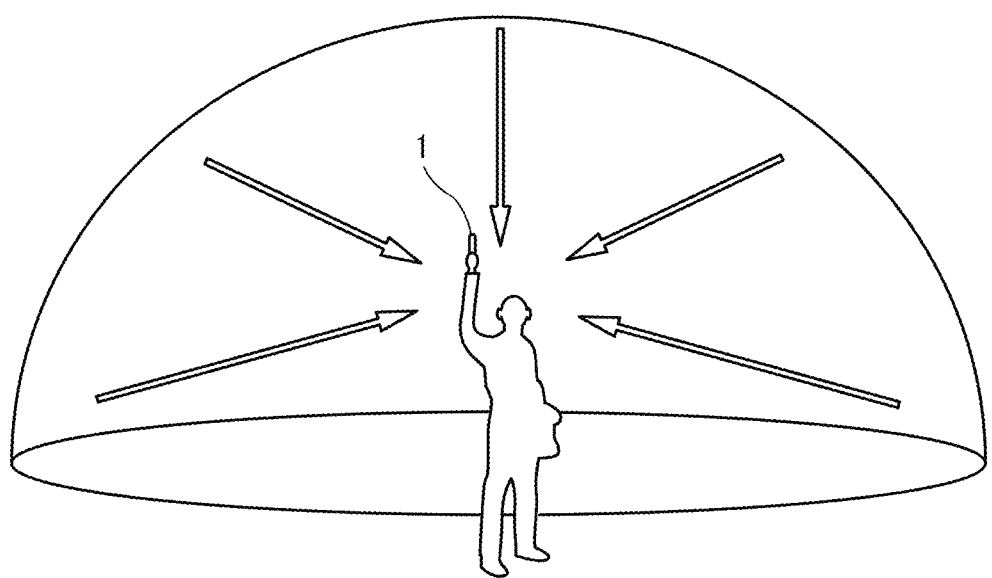
FIG. 2 is an illustration of how a user uses the image capturing device according to an embodiment of the present disclosure.

Next, a description is given of a situation where the image capturing device 1 is used, with reference to FIG. 2. FIG. 2 illustrates an example of how a user uses the image capturing device 1. As illustrated in FIG. 2, for example, the image capturing device 1 is used for capturing objects surrounding the user who is holding the image capturing device 1 in his or her hand. The imaging elements 103a and 103b illustrated in FIGS. 1A to 1C capture the objects surrounding the user to obtain two hemispherical images.

Figure 3A:
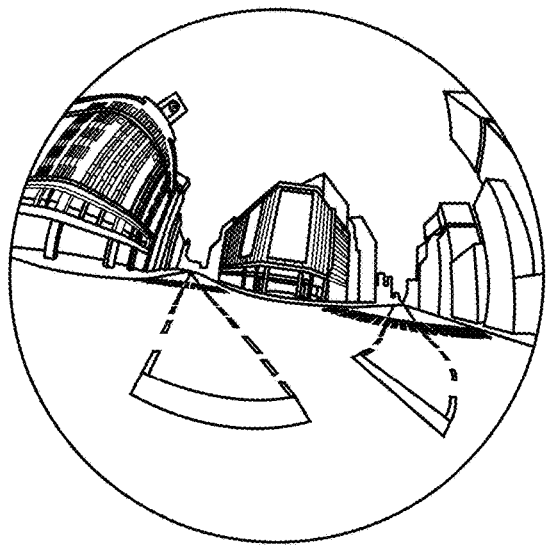
FIG. 3A is an illustration of a front side of a hemispherical image captured by the image capturing device according to an embodiment of the present disclosure.
Figure 3B:
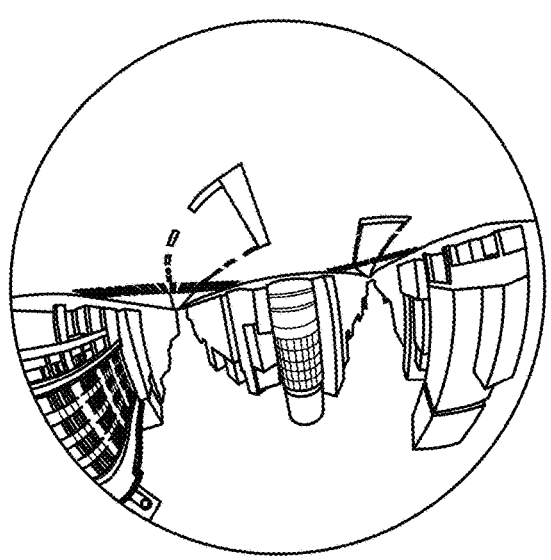
FIG. 3B is an illustration of a back side of the hemispherical image captured by the image capturing device according to an embodiment of the present disclosure.
Figure 3C:
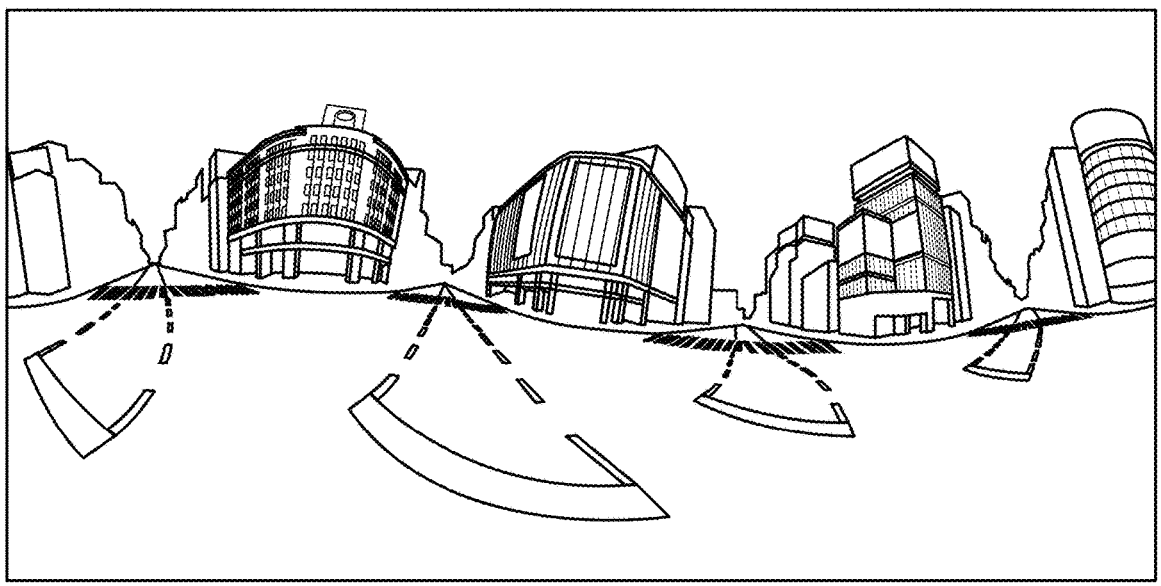
FIG. 3C is an illustration of an image captured by the image capturing device represented by Mercator projection, according to an embodiment of the present disclosure.
Figure 4B:
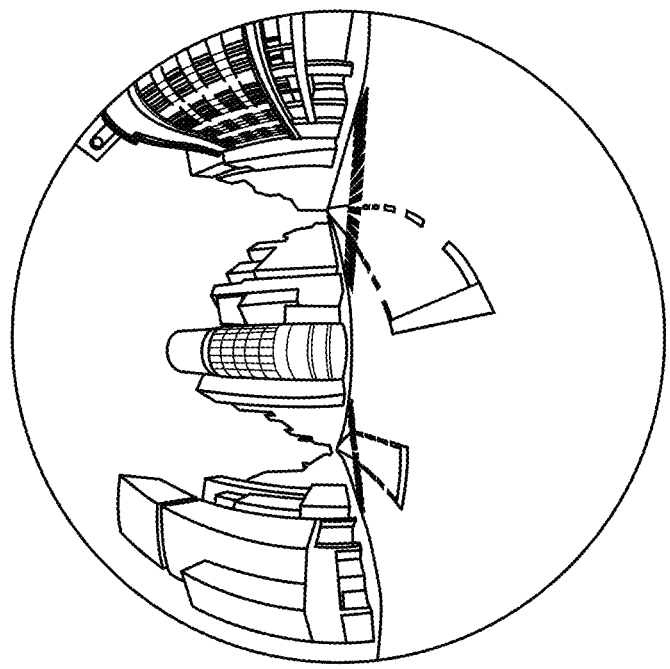
FIG. 4B is an illustration of a spherical panoramic image, according to an embodiment of the present disclosure.
Figure 4A:
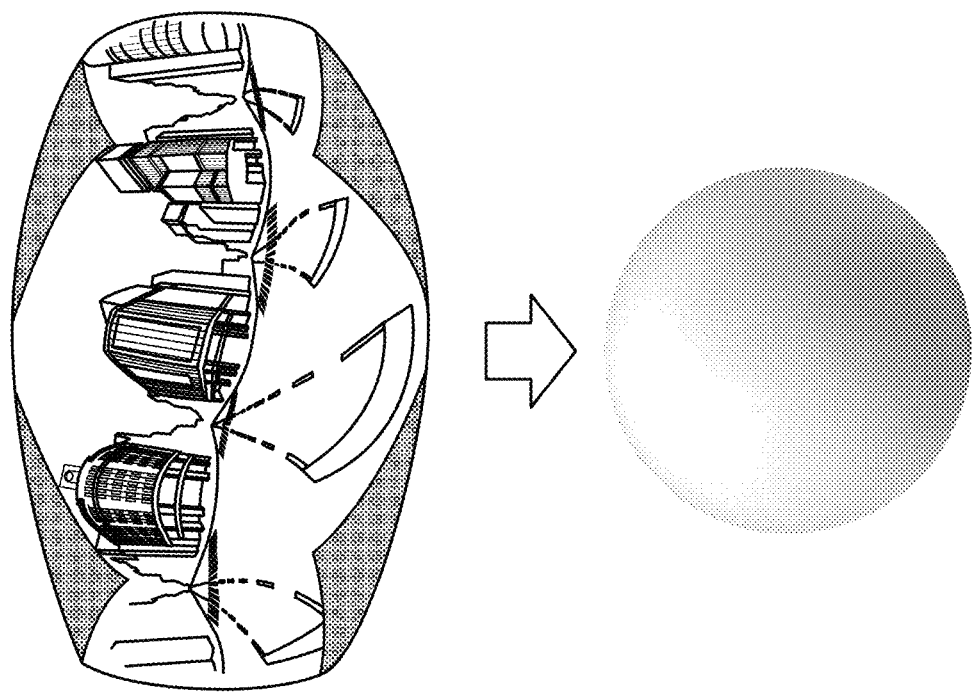
FIG. 4A is an illustration of a Mercator image covering a sphere, according to an embodiment of the present disclosure.

Next, a description is given of an overview of an operation of generating a spherical panoramic image from the images captured by the image capturing device 1, with reference to FIGS. 3A to 3C and FIGS. 4A and 4B. FIG. 3A is a view illustrating a front side of a hemispherical image captured by the image capturing device 1. FIG. 3B is a view illustrating a back side of a hemispherical image captured by the image capturing device 1. FIG. 3C is a view illustrating an image in Mercator projection. The image in Mercator projection as illustrated in FIG. 3C is referred to as a "Mercator image" hereinafter. FIG. 4A is a conceptual diagram illustrating an example of how the Mercator image maps to a surface of a sphere. FIG. 4B is a view illustrating a spherical panoramic image.

As illustrated in FIG. 3A, an image captured by the imaging element 103a is a curved hemispherical image (front side) taken through the fisheye lens 102a described later. Also, as illustrated in FIG. 3B, an image captured by the imaging element 103b is a curved hemispherical image (back side) taken through the fisheye lens 102b described later. The hemispherical image (front side) and the hemispherical image (back side), which is reversed by 180-degree from each other, are combined by the image capturing device 1. This result in generation of the Mercator image as illustrated in FIG. 3C.

The Mercator image is mapped on the sphere surface using Open Graphics Library for Embedded Systems (OpenGL ES) as illustrated in FIG. 4A. This results in generation of the spherical panoramic image as illustrated in FIG. 4B. In other words, the spherical panoramic image is represented as the Mercator image, which corresponds to a surface facing a center of the sphere. It should be noted that OpenGL ES is a graphic library used for visualizing two-dimensional (2D) and three-dimensional (3D) data. The spherical panoramic image is either a still image or a moving image.

One may feel strange viewing the spherical panoramic image, because the spherical panoramic image is an image mapped to the sphere surface. To resolve this strange feeling, an image of a predetermined area, which is a part of the spherical panoramic image, is displayed as a planar image having fewer curves. The image of the predetermined area is referred to as a "predetermined-area image" hereinafter. Hereinafter, a description is given of displaying the predetermined-area image, with reference to FIG. 5 and FIGS. 6A and 6B.

Figure 5:
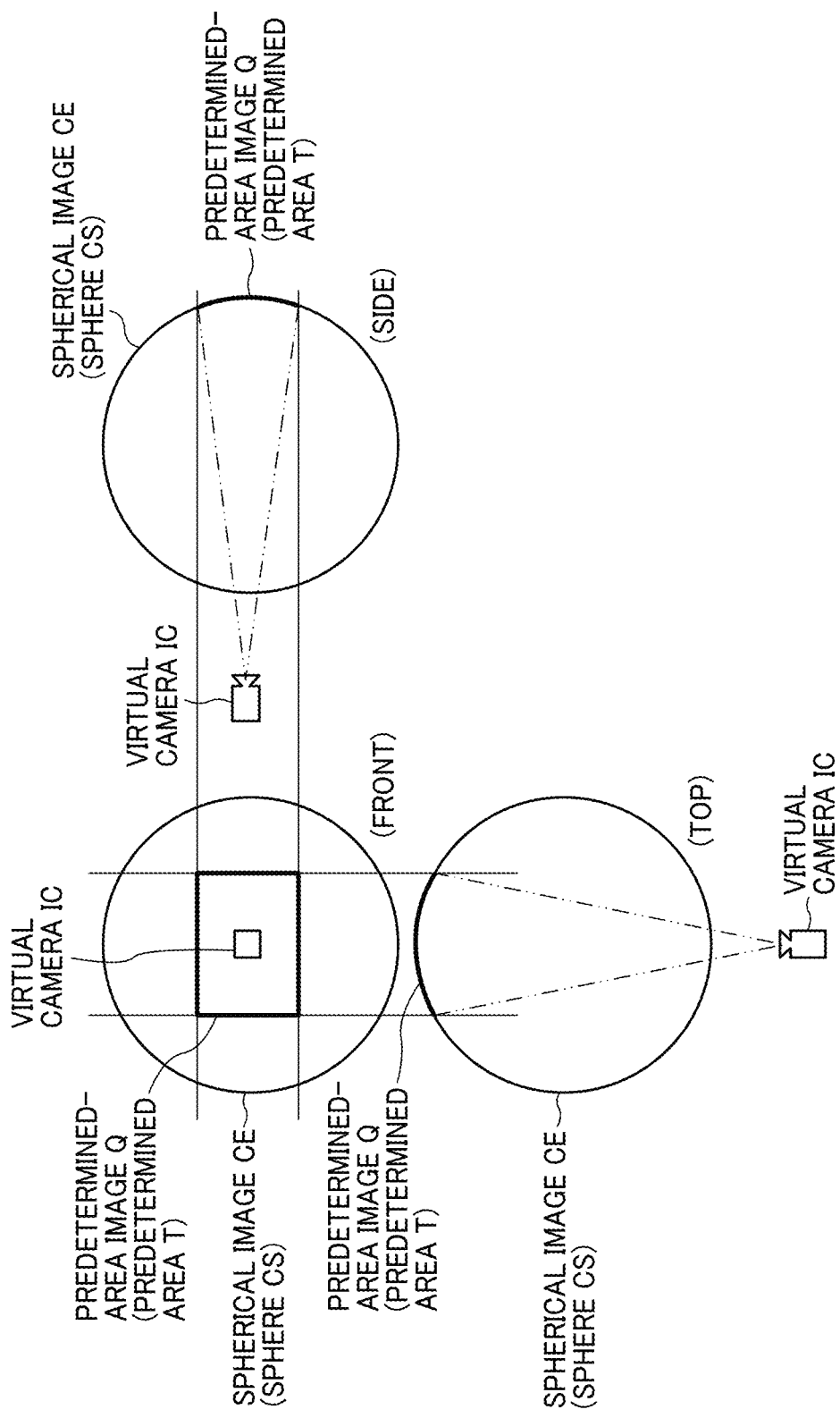
FIG. 5 is an illustration of relative positions of a virtual camera and a predetermined area in a case where the spherical panoramic image is represented as a three-dimensional sphere, according to an embodiment of the present disclosure.
Figure 6A:
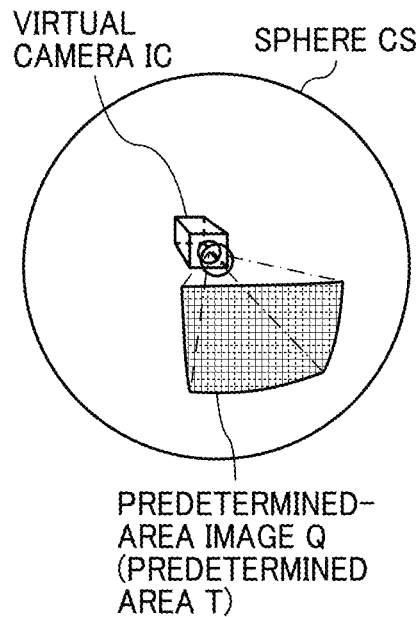
FIG. 6A is a perspective view of FIG. 5.
Figure 6B:
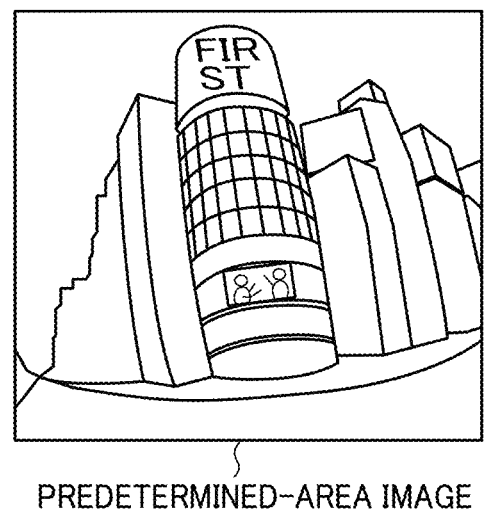
FIG. 6B is an illustration of an image of the predetermined area displayed on a display of a communication terminal, according to an embodiment of the present disclosure.

FIG. 5 is a view illustrating positions of a virtual camera IC and a predetermined area T in a case where the spherical image is represented as a surface area of a three-dimensional sphere. The virtual camera IC corresponds to a position of a point of view (viewpoint) of a user who is viewing the spherical image CE represented as a surface area of the three-dimensional sphere CS. FIG. 6A is a perspective view of the spherical image CE illustrated in FIG. 5. FIG. 6B is a view illustrating the predetermined-area image Q when displayed on a display. In FIG. 6A, the spherical image CE illustrated in FIG. 4B is represented as a surface area of the three-dimensional sphere CS. Assuming that the spherical image CE is a surface area of the sphere CS, the virtual camera IC is outside of the spherical image CE as illustrated in FIG. 5. The predetermined area T in the spherical image CE is an imaging area of the virtual camera IC. Specifically, the predetermined area T is specified by predetermined-area information indicating an imaging direction and an angle of view of the virtual camera IC in a three-dimensional virtual space containing the spherical image CE.

The predetermined-area image Q, which is an image of the predetermined area T illustrated in FIG. 6A, is displayed on a display as an image of an imaging area of the virtual camera IC, as illustrated in FIG. 6B. FIG. 6B illustrates the predetermined-area image Q represented by the predetermined-area information that is set by default. In another example, the predetermined-area image Q is specified by an imaging area (X, Y, Z) of the virtual camera IC, i.e., the predetermined area T, rather than the predetermined-area information, i.e., the position coordinate of the virtual camera IC. The following description is provided using an imaging direction (rH, rV) and an angle of view α of the virtual camera IC.

Figure 7:
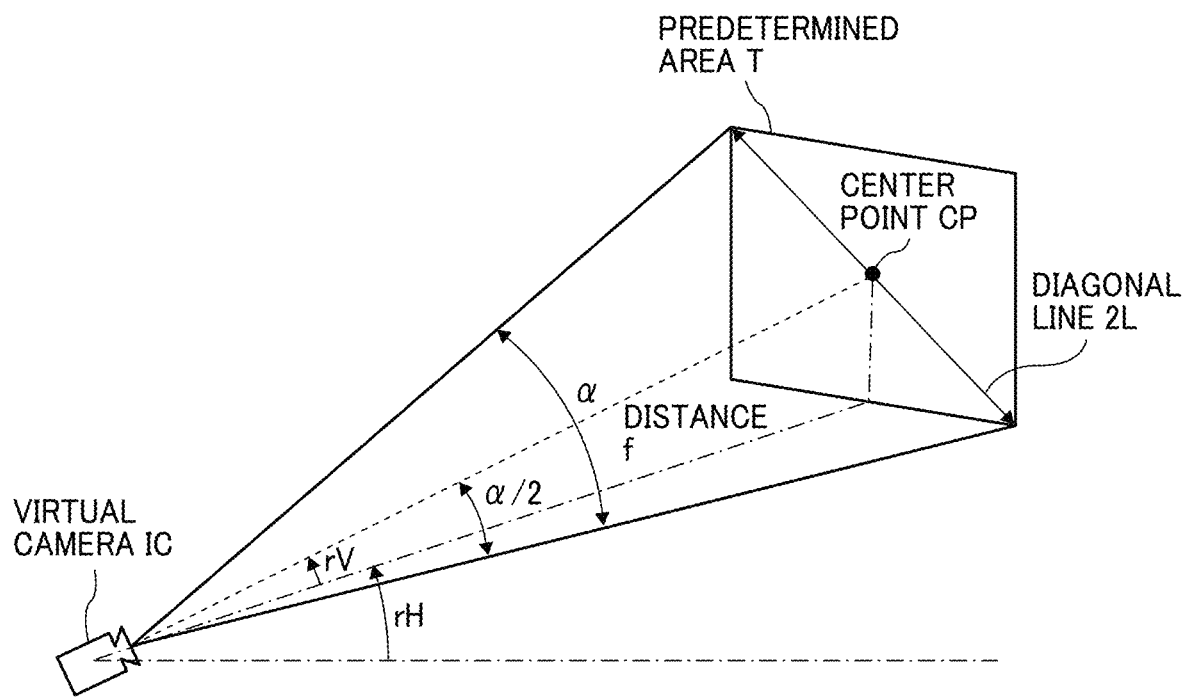
FIG. 7 is a view illustrating a relation between predetermined-area information and an image of a predetermined area, according to an embodiment of the present disclosure.

Referring to FIG. 7, a relation between the predetermined-area information and an image of the predetermined area T is described according to the embodiment. FIG. 7 is a view illustrating a relation between the predetermined-area information and the predetermined area T. As illustrated in FIG. 7, "rH" denotes a horizontal radian, "rV" denotes a vertical radian, and "α" denotes an angle of view, respectively, of the virtual camera IC. The position of the virtual camera IC is adjusted, such that the point of gaze of the virtual camera IC, indicated by the imaging direction (rH, rV), matches a center point CP of the predetermined area T as the imaging area of the virtual camera IC. The predetermined-area image Q is an image of the predetermined area T, in the spherical image CE. Distance "f" is a distance from the virtual camera IC to the center point CP of the predetermined area T. Distance "L" is a distance between the center point CP and a given vertex of the predetermined area T (2L is a diagonal line). In FIG. 7, a trigonometric function equation generally expressed by the following equation 1 is satisfied.

$$L/f = \tan(\alpha/2) \quad \text{(Equation 1)}$$

Figure 8:
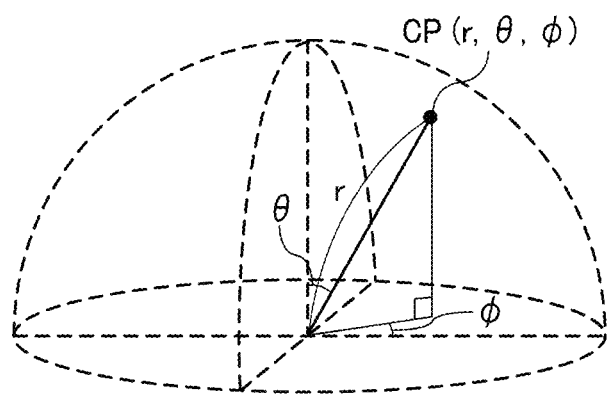
FIG. 8 is a view illustrating points in a three-dimensional Euclidean space according to spherical coordinates, according to an embodiment of the present disclosure.

FIG. 8 is a view illustrating points in a three-dimensional Euclidean space according to spherical coordinates, according to the embodiment. A positional coordinate (r, θ, φ) is given when the center point CP is represented by a spherical polar coordinates system. The positional coordinate (r, θ, φ) represents a moving radius, a polar angle, and an azimuth angle. The moving radius r is a distance from an origin of the three-dimensional virtual space including the spherical panoramic image to the center point CP. Accordingly, the radius r is equal to f. FIG. 8 illustrates a relation between these items. The following description is provided using the positional coordinate (r, θ, φ) of the virtual camera IC.

<Overview of Image Communication System>

Figure 9:
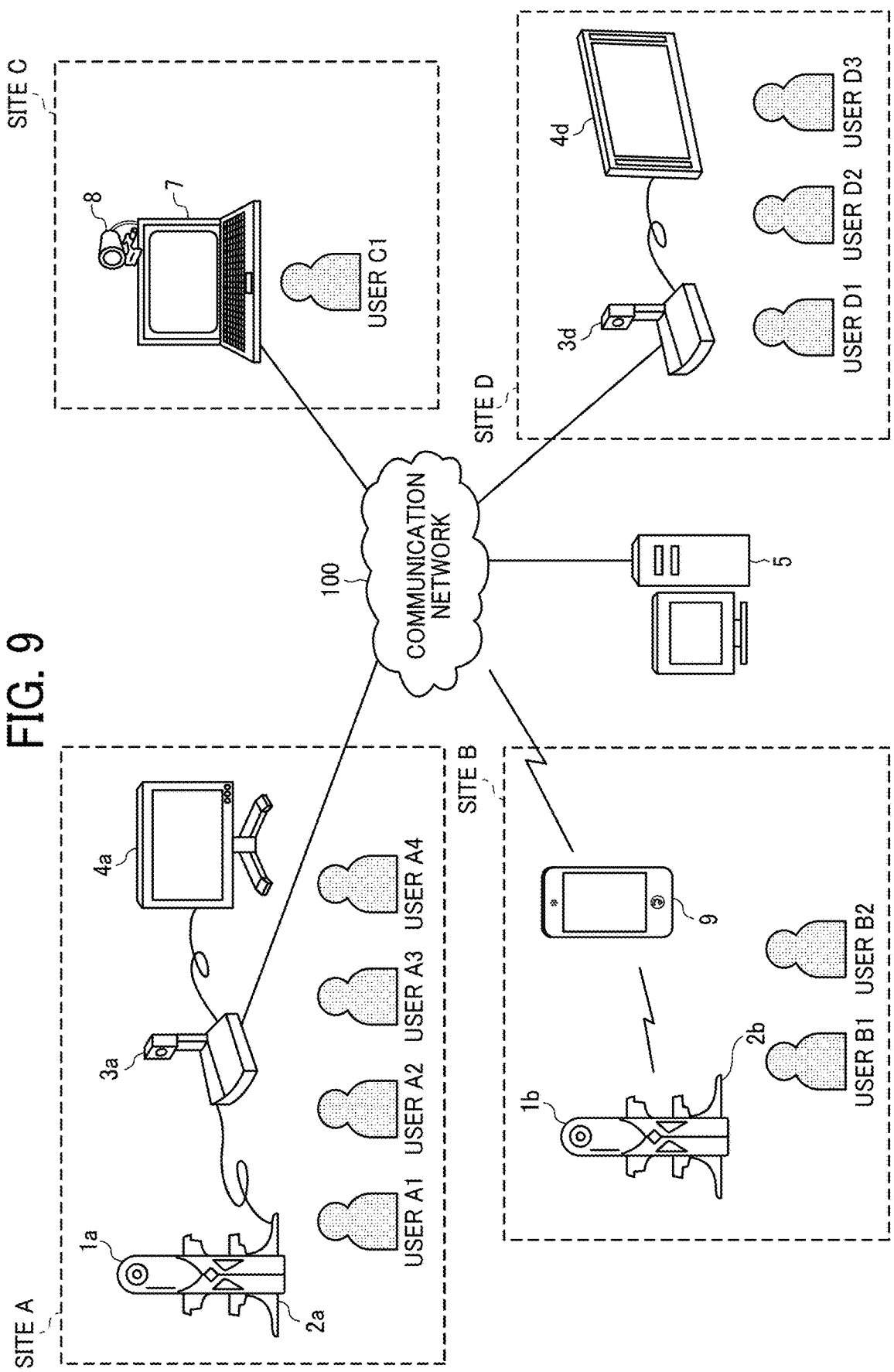
FIG. 9 is a schematic diagram illustrating a configuration of an image communication system, according to an embodiment of the present disclosure.

Referring to FIG. 9, an overview of a configuration of an image communication system according to the present embodiment is described. FIG. 9 is a schematic diagram illustrating a configuration of the image communication system, according to the present embodiment.

As illustrated in FIG. 9, the image communication system according to the present embodiment includes an image capturing device 1a, an image capturing device 1b, a videoconference terminal 3a, a videoconference terminal 3d, a display 4a, a display 4d, a communication management system 5, a personal computer (PC) 7, an image capturing device 8, and a smartphone 9. The videoconference terminal 3a, the smartphone 9, the PC 7, and the videoconference terminal 3d communicate data with one another via a communication network 100 such as the Internet. The communication network 100 can be either a wireless network or a wired network.

Each of the image capturing device 1a and the image capturing device 1b is a special-purpose digital camera, which captures an image of an object or surroundings such as scenery to obtain two hemispherical images, from which a spherical panoramic image is generated. By contrast, the image capturing device 8 is a general-purpose digital camera that captures an image of a subject or surroundings to obtain a general planar image.

Each of the videoconference terminal 3a and the videoconference terminal 3d is a terminal that is dedicated to videoconferencing. The videoconference terminal 3a and the videoconference terminal 3d display an image of video communication (video calling) on the display 4a and the display 4d, respectively, via a wired cable such as a universal serial bus (USB). The videoconference terminal 3a usually captures an image by a camera 312, which is described later. However, in a case where the videoconference terminal 3a is connected to a cradle 2a on which the image capturing device 1a is mounted, the image capturing device 1a is preferentially used. Accordingly, two hemispherical images are obtained, from which a spherical panoramic image is generated. When a wired cable is used for connecting the videoconference terminal 3a and the cradle 2a, the cradle 2a supplies power to the image capturing device 1a and holds the image capturing device 1a in addition to establishing a communication between the image capturing device 1a and the videoconference terminal 3a. In the embodiment, the image capturing device 1a, the cradle 2a, the videoconference terminal 3a, and the display 4a are located in the same site A. In the site A, four users A1, A2, A3 and A4 are participating in video communication. On the other hand, the videoconference terminal 3d and the display 4d are located in the same site D. In the site D, three users D1, D2, and D3 are participating in video communication.

The communication management system 5 manages and controls communication among the videoconference terminal 3a, the videoconference terminal 3d, the PC 7 and the smartphone 9. Further, the communication management system 5 manages types (a general image type and a special image type) of image data to be exchanged. Accordingly, the communication management system 5 is a communication control system. In the embodiment, a special image is a spherical panoramic image. The communication management system 5 is located, for example, at a service provider that provides video communication service. In one example, the communication management system 5 is configured as a single computer. In another example, the communication management system 5 is constituted as a plurality of computers to which divided portions (functions, means, or storages) are arbitrarily allocated. In other words, the communication management system 5 can be implemented by a plurality of servers that operate in cooperation with one another.

The PC 7 performs video communication with the image capturing device 8 connected thereto. In the embodiment, the PC 7 and the image capturing device 8 are located in the same site C. In the site C, one user C is participating in video communication.

The smartphone 9 includes a display 917, which is described later, and displays an image of video communication on the display 917. The smartphone 9 includes a complementary metal oxide semiconductor (CMOS) sensor 905, and usually captures an image with the CMOS sensor 905. In addition, the smartphone 9 is configured to acquire data of two hemispherical images captured by the image capturing device 1b, from which a spherical panoramic image is generated, using wireless communication such as Wireless Fidelity (Wi-Fi) and Bluetooth (registered trademark). When wireless communication is used for acquiring the data of two hemispherical images, a cradle 2b supplies power with the image capturing device 1b and holds the image capturing device 1b, but not establish a communication. In the embodiment, the image capturing device 1b, the cradle 2b, and the smartphone 9 are located in the same site B. Further, in the site B, two users B1 and B2 are participating in video communication.

The videoconference terminal 3a, the videoconference terminal 3d, the PC 7 and the smartphone 9 are each an example of a communication terminal. OpenGL ES is installed in each of these communication terminals to enable each communication terminal to generate predetermined-area information that indicates a partial area of a spherical panoramic image, or to generate a predetermined-area image from a spherical panoramic image that is transmitted from a different communication terminal.

The arrangement of the terminals, apparatuses and users illustrated in FIG. 9 is just an example, and any other suitable arrangement will suffice. For example, in the site C, an image capturing device configured to perform image capturing relating to a spherical panoramic image can be used in place of the image capturing device 8. In addition, examples of the communication terminal include a digital television, a smartwatch, and a car navigation device. In the following description, any arbitrary one of the image capturing device 1a and the image capturing device 1b is referred to as "image capturing device 1". Further, any arbitrary one of the videoconference terminal 3a and the videoconference terminal 3d is referred to as "videoconference terminal 3", hereinafter. Furthermore, any arbitrary one of the display 4a and the display 4d is referred to as "display 4", hereinafter.

<Hardware Configuration of Embodiment>

Next, referring to FIG. 10 to FIG. 13, a description is given in detail of hardware configurations of the image capturing device 1, the videoconference terminal 3, the communication management system 5, the PC 7, and the smartphone 9, according to the present embodiment. Since the image capturing device 8 is a general-purpose camera, a detailed description thereof is omitted.

<Hardware Configuration of Image Capturing Device 1>

Figure 10:
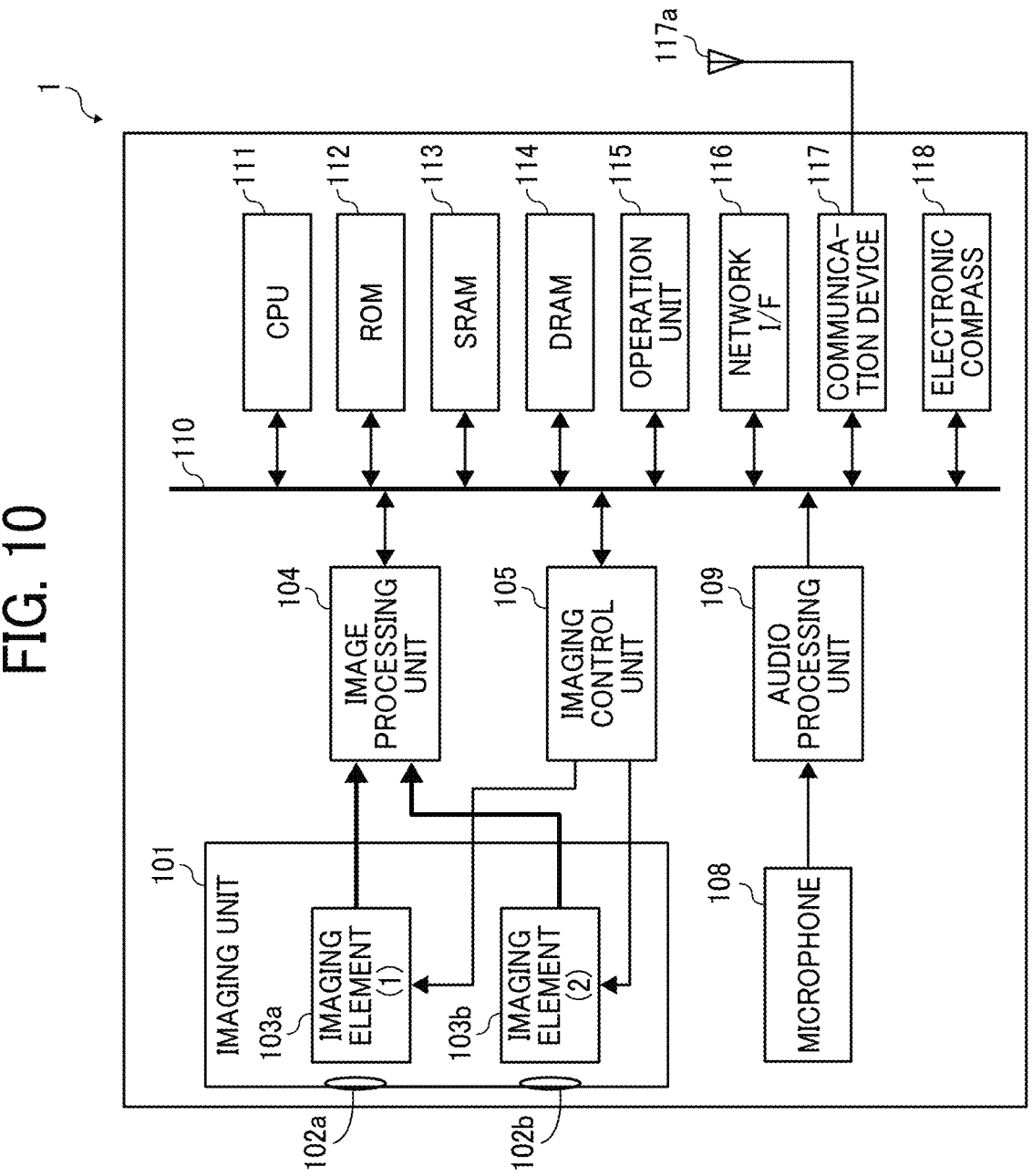
FIG. 10 is a block diagram illustrating a hardware configuration of the image capturing device, according to an embodiment of the present disclosure.

First, referring to FIG. 10, a hardware configuration of the image capturing device 1 is described according to the embodiment. FIG. 10 is a block diagram illustrating a hardware configuration of the image capturing device 1 according to the embodiment. The following describes a case in which the image capturing device 1 is a spherical (omnidirectional) image capturing device having two imaging elements. However, the image capturing device 1 may include any suitable number of imaging elements, providing that it includes at least two imaging elements. In addition, the image capturing device 1 is not necessarily an image capturing device dedicated to omnidirectional image capturing. In another example, an external omnidirectional image capturing unit can be attached to a general-purpose digital camera or a smartphone to implement an image capturing device having substantially the same function as that of the image capturing device 1.

As illustrated in FIG. 10, the image capturing device 1 includes an imaging unit 101, an image processing unit 104, an imaging control unit 105, a microphone 108, an audio processing unit 109, a central processing unit (CPU) 111, a read only memory (ROM) 112, a static random access memory (SRAM) 113, a dynamic random access memory (DRAM) 114, the operation unit 115, a network interface (I/F) 116, a communication device 117, and an antenna 117*a*.

The imaging unit 101 includes two wide-angle lenses (so-called fisheye lenses) 102*a* and 102*b*, each having an angle of view of equal to or greater than 180 degrees so as to form a hemispherical image. The imaging unit 101 further includes the two imaging elements 103*a* and 103*b* corresponding to the wide-angle lenses 102*a* and 102*b* respectively. The imaging elements 103*a* and 103*b* each includes an imaging sensor such as a CMOS sensor and a charge-coupled device (CCD) sensor, a timing generation circuit, and a group of registers. The imaging sensor converts an optical image formed by the fisheye lenses 102*a* and 102*b* into electric signals to output image data. The timing generation circuit generates horizontal or vertical synchronization signals, pixel clocks and the like for the imaging sensor. Various commands, parameters and the like for operations of the imaging elements 103*a* and 103*b* are set in the group of registers.

Each of the imaging elements 103*a* and 103*b* of the imaging unit 101 is connected to the image processing unit 104 via a parallel I/F bus. In addition, each of the imaging elements 103*a* and 103*b* of the imaging unit 101 is connected to the imaging control unit 105 via a serial I/F bus such as an I2C bus. The image processing unit 104 and the imaging control unit 105 are each connected to the CPU 111 via a bus 110. Furthermore, the ROM 112, the SRAM 113, the DRAM 114, the operation unit 115, the network I/F 116, the communication device 117, and the electronic compass 118 are also connected to the bus 110.

The image processing unit 104 acquires image data from each of the imaging elements 103*a* and 103*b* via the parallel I/F bus and performs predetermined processing on each image data. Thereafter, the image processing unit 104 combines these image data to generate data of the Mercator image as illustrated in FIG. 3C.

The imaging control unit 105 usually functions as a master device while the imaging elements 103*a* and 103*b* each usually functions as a slave device. The imaging control unit 105 sets commands and the like in the group of registers of the imaging elements 103*a* and 103*b* via the serial I/F bus such as the I2C bus. The imaging control unit 105 receives necessary commands from the CPU 111. Further, the imaging control unit 105 acquires status data and the like of the group of registers of the imaging elements 103*a* and 103*b* via the serial I/F bus such as the I2C bus. The imaging control unit 105 sends the acquired status data and the like to the CPU 111.

The imaging control unit 105 instructs the imaging elements 103*a* and 103*b* to output the image data at a time when the shutter button of the operation unit 115 is pressed. In some cases, the image capturing device 1 is configured to display a preview image on a display (e.g., a display of the videoconference terminal 3*a*) or to display a moving image (movie). In case of displaying movie, image data are continuously output from the imaging elements 103*a* and 103*b* at a predetermined frame rate (frames per minute).

Furthermore, the imaging control unit 105 operates in cooperation with the CPU 111, to synchronize the time when the imaging element 103*a* outputs image data and the time when the imaging element 103*b* outputs the image data. It should be noted that, although the image capturing device 1 does not include a display in the present embodiment, the image capturing device 1 can include a display.

The microphone 108 converts sound to audio data (signal). The audio processing unit 109 acquires audio data output from the microphone 108 via an I/F bus and performs predetermined processing on the audio data.

The CPU 111 controls entire operation of the image capturing device 1 and performs necessary processing. The ROM 112 stores various programs for execution by the CPU 111. The SRAM 113 and the DRAM 114 each operates as a work memory to store programs loaded from the ROM 112 for execution by the CPU 111 or data in current processing. More specifically, in one example, the DRAM 114 stores image data currently processed by the image processing unit 104 and data of the Mercator image on which processing has been performed.

The operation unit 115 collectively refers to various operation keys, a power switch, the shutter button, and a touch panel having functions of both displaying information and receiving input from a user, which can be used in combination. A user operates the operation keys to input various image capturing (photographing) modes or image capturing (photographing) conditions.

The network I/F 116 collectively refers to an interface circuit such as a USB I/F that allows the image capturing device 1 to communicate data with an external medium such as an SD card or an external personal computer. The network I/F 116 supports at least one of wired and wireless communications. The data of the Mercator image, which is stored in the DRAM 114, is stored in the external medium via the network I/F 116 or transmitted to the external device such as the videoconference terminal 3*a* via the network I/F 116, at any desired time.

The communication device 117 communicates data with an external device such as the videoconference terminal 3*a* via the antenna 117*a* of the image capturing device 1 using a short-range wireless communication network such as Wi-Fi and Near Field Communication (NFC). The communication device 117 is also configured to transmit the data of Mercator image to the external device such as the videoconference terminal 3*a*.

The electronic compass 118 calculates an orientation and a tilt (roll angle) of the image capturing device 1 from the Earth's magnetism to output orientation and tilt information. This orientation and tilt information is an example of related information, which is metadata described in compliance with Exif. This information is used for image processing such as image correction of captured images. The related information also includes data of a time (date) when an image is captured by the image capturing device 1, and data of an amount of image data, for example.

<Hardware Configuration of Videoconference Terminal 3>

Figure 11:
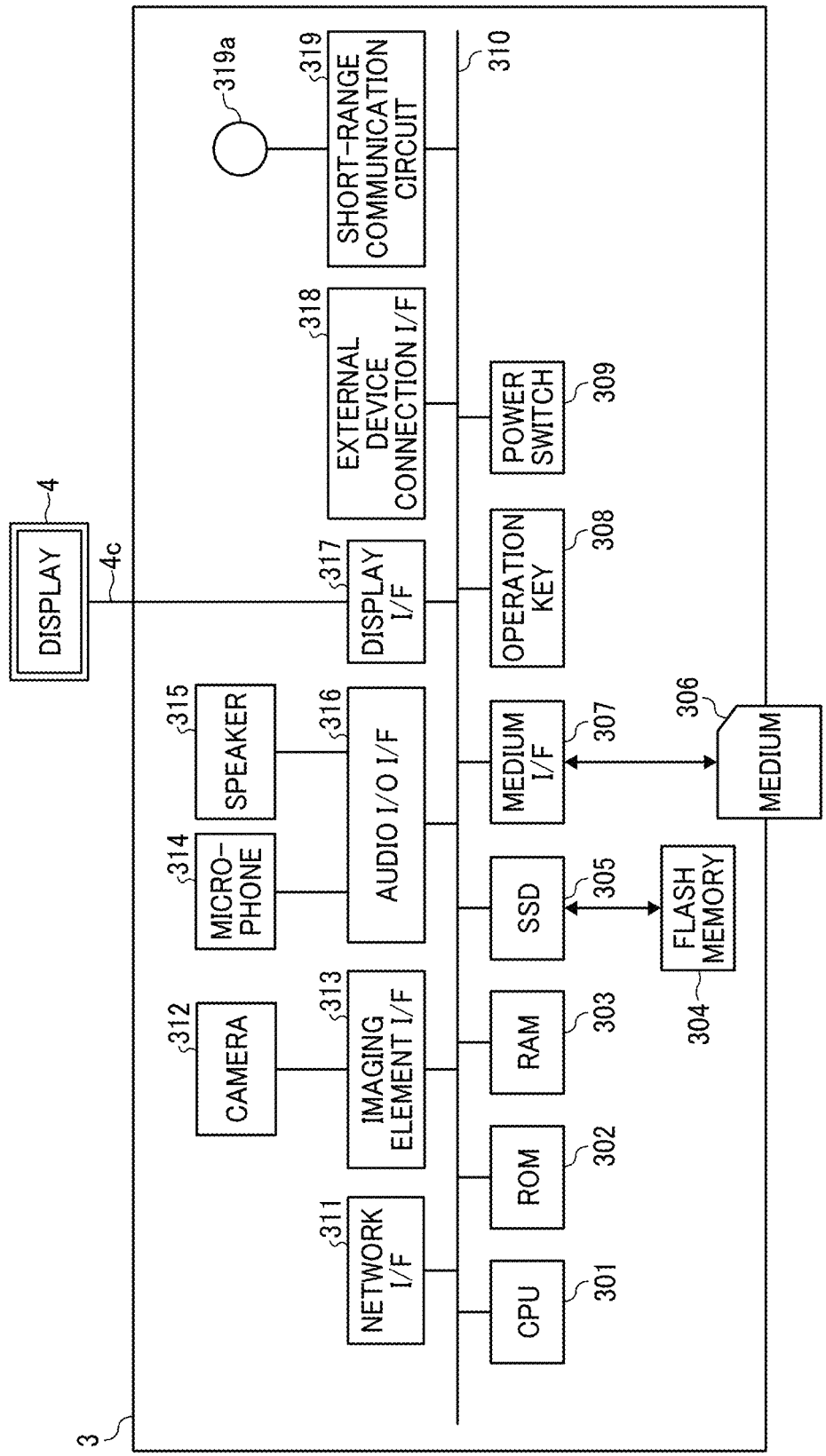
FIG. 11 is a block diagram illustrating a hardware configuration of a videoconference terminal, according to an embodiment of the present disclosure.

Next, referring to FIG. 11, a hardware configuration of the videoconference terminal 3 is described according to the embodiment. FIG. 11 is a block diagram illustrating a hardware configuration of the videoconference terminal 3 according to the embodiment. As illustrated in FIG. 11, the videoconference terminal 3 includes a CPU 301, a ROM 302, a RAM 303, a flash memory 304, a solid state drive (SSD) 305, a medium I/F 307, an operation key 308, a power switch 309, a bus line 310, a network I/F 311, a camera 312, an imaging element I/F 313, a microphone 314, a speaker 315, an audio input/output I/F 316, a display I/F 317, an external device connection I/F 318, a short-range communication circuit 319, and an antenna 319a for the short-range communication circuit 319.

The CPU 301 controls entire operation of the videoconference terminal 3. The ROM 302 stores a control program such as an Initial Program Loader (IPL) to boot the CPU 301. The RAM 303 is used as a work area for the CPU 301. The flash memory 304 stores various data such as a communication control program, image data, and audio data. The SSD 305 controls reading or writing of various data to or from the flash memory 304 under control of the CPU 301. In alternative to the SSD, a hard disc drive (HDD) can be used. The medium I/F 307 controls reading or writing (storing) of data with respect to a storage medium 306 such as a flash memory. The operation key (keys) 308 is operated by a user to input a user instruction such as a user selection of a communication destination of the videoconference terminal 3. The power switch 309 is a switch that turns on or off the power of the videoconference terminal 3.

The network I/F 311 in an interface that controls communication of data with an external device through the communication network 100 such as the Internet. The camera 312 is an example of a built-in imaging device configured to capture a subject under control of the CPU 301 to obtain image data. The imaging element I/F 313 is a circuit that controls driving of the camera 312. The microphone 314 is an example of a built-in audio collecting device configured to input audio. The audio input/output I/F 316 is a circuit for controlling input and output of audio signals between the microphone 314 and the speaker 315 under control of the CPU 301. The display I/F 317 is a circuit for transmitting image data to the external display 4 under control of the CPU 301. The external device connection I/F 318 is an interface that connects the videoconference terminal 3 to various external devices. The short-range communication circuit 319 is a communication circuit that communicates in compliance with the NFC (registered trademark), the Bluetooth (registered trademark) and the like.

The bus line 310 is an address bus, a data bus or the like, which electrically connects the elements in FIG. 11 such as the CPU 301.

The display 4 is an example of display means for displaying an image of a subject, an operation icon, etc. The display 4 is configured as a liquid crystal display or an organic electroluminescence (EL) display, for example. The display 4 is connected to the display I/F 317 by a cable 4c. For example, the cable 4c is an analog red green blue (RGB) (video graphic array (VGA)) signal cable, a component video cable, a high-definition multimedia interface (HDMI) (registered trademark) signal cable, or a digital video interactive (DVI) signal cable.

The camera 312 includes a lens and a solid-state imaging element that converts an image (video) of a subject to electronic data by converting light to electric charge. As the solid-state imaging element, for example, a CMOS sensor or a CCD sensor is used. The external device connection I/F 318 is configured to connect an external device such as an external camera, an external microphone, or an external speaker through a USB cable or the like. When an external camera is connected, the external camera is driven in preference to the built-in camera 312 under control of the CPU 301. Similarly, when an external microphone is connected or an external speaker is connected, the external microphone or the external speaker is driven in preference to the built-in microphone 314 or the built-in speaker 315 under control of the CPU 301.

The storage medium 306 is removable from the videoconference terminal 3. In addition to or in alternative to the flash memory 304, any suitable nonvolatile memory, such as an electrically erasable and programmable ROM (EEPROM) can be used, provided that it reads or writes data under control of CPU 301.

<Hardware Configuration of Communication Management System 5 and PC 7>

Figure 12:
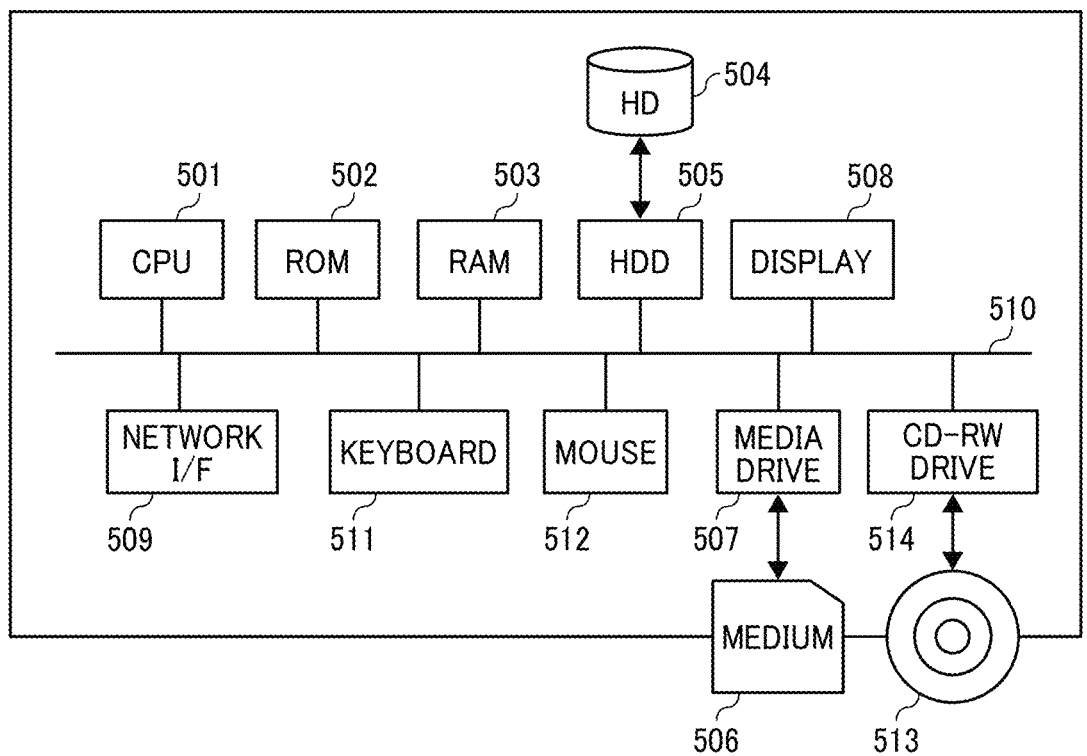
FIG. 12 is a block diagram illustrating a hardware configuration of any one of a communication management system and a personal computer, according to an embodiment of the present disclosure.

Next, referring to FIG. 12, a hardware configuration of any one of the communication management system 5 and the PC 7 is described, according to the embodiment. FIG. 12 is a block diagram illustrating a hardware configuration of any one of the communication management system 5 and the PC 7, according to the embodiment. In the embodiment, both the communication management system 5 and the PC 7 are implemented by a computer. Therefore, a description is given of a configuration of the communication management system 5, and the description of a configuration of the PC 7 is omitted, having the same or substantially the same configuration as that of the communication management system 5.

The communication management system 5 includes a CPU 501, a ROM 502, a RAM 503, a hard disc (HD) 504, an HDD 505, a media drive 507, a display 508, a network I/F 509, a keyboard 511, a mouse 512, a compact disc rewritable (CD-RW) drive 514, and a bus line 510. The CPU 501 controls entire operation of the communication management system 5. The ROM 502 stores a control program such as an IPL to boot the CPU 501. The RAM 503 is used as a work area for the CPU 501. The HD 504 stores various types of data, such as a control program for the communication management system 5. The HDD 505 controls reading or writing of various data to or from the HD 504 under control of the CPU 501. The media drive 507 controls reading or writing (storing) of data from and to a storage medium 506 such as a flash memory. The display 508 displays various information such as a cursor, menu, window, characters, or image. The network I/F 509 is an interface that controls communication of data with an external device through the communication network 100. The keyboard 511 includes a plurality of keys to allow a user to input characters, numerals, or various instructions. The mouse 512 allows a user to select a specific instruction or execution, select a target for processing, or move a cursor being displayed. The CD-RW drive 514 controls reading or writing of various data to and from a CD-RW 513, which is one example of a removable storage medium. The bus line 510 is an address bus, a data bus or the like, which electrically connects the above-described hardware elements, as illustrated in FIG. 12.

<Hardware Configuration of Smartphone 9>

Figure 13:
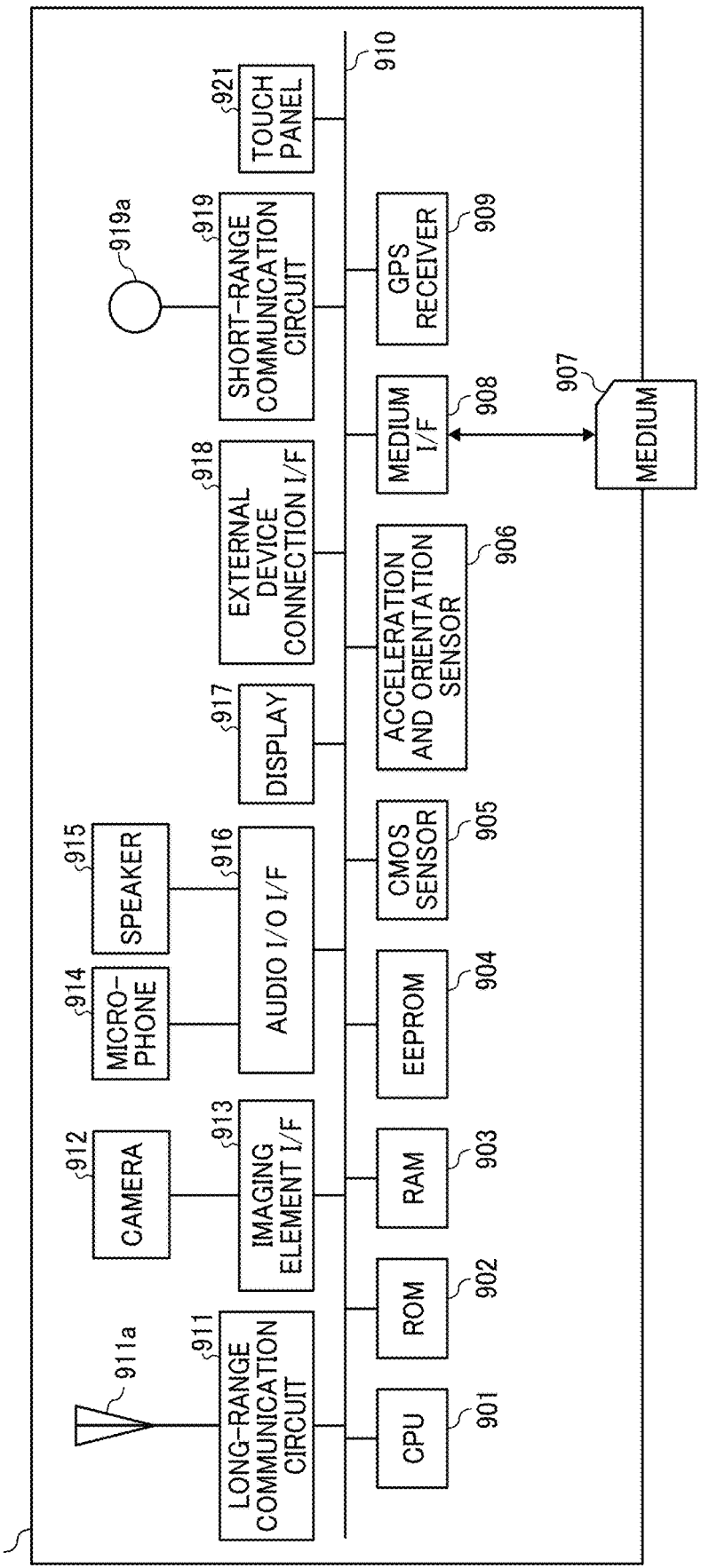
FIG. 13 is a block diagram illustrating a hardware configuration of a smartphone, according to an embodiment of the present disclosure.

Referring to FIG. 13, a hardware configuration of the smartphone 9 is described, according to the embodiment. FIG. 13 is a block diagram illustrating a hardware configuration of the smartphone 9, according to the embodiment. As illustrated in FIG. 13, the smartphone 9 includes a CPU 901, a ROM 902, a RAM 903, an EEPROM 904, a CMOS sensor 905, an acceleration and orientation sensor 906, a medium I/F 908, and a global positioning system (GPS) receiver 909.

The CPU 901 controls entire operation of the smartphone 9. The ROM 902 stores a control program such as an IPL to boot the CPU 901. The RAM 903 is used as a work area for the CPU 901. The EEPROM 904 reads or writes various data such as a control program for a smartphone under control of the CPU 901. The CMOS sensor 905 captures an object (mainly, a user operating the smartphone 9) under control of the CPU 901 to obtain image data. The acceleration and orientation sensor 906 includes various sensors such as an electromagnetic compass for detecting geomagnetism, a gyrocompass, and an acceleration sensor. The medium I/F 908 controls reading or writing of data to and from a storage medium 907 such as a flash memory. The GPS receiver 909 receives a GPS signal from a GPS satellite.

The smartphone 9 further includes a long-range communication circuit 911, a camera 912, an imaging element I/F 913, a microphone 914, a speaker 915, an audio input/output I/F 916, a display 917, an external device connection I/F 918, a short-range communication circuit 919, an antenna 919a for the short-range communication circuit 919, and a touch panel 921.

The long-range communication circuit 911 is a circuit that communicates with other device through the communication network 100. The camera 912 is an example of a built-in imaging device configured to capture a subject under control of the CPU 901 to obtain image data. The imaging element I/F 913 is a circuit that controls driving of the camera 912. The microphone 914 is an example of a built-in audio collecting device configured to input audio. The audio input/output I/F 916 is a circuit for controlling input and output of audio signals between the microphone 914 and the speaker 915 under control of the CPU 901. The display 917 is an example of a display device that displays an image of a subject, various icons, etc. The display 917 is configured as a liquid crystal display or an organic EL display, for example. The external device connection I/F 918 is an interface that connects the smartphone 9 to various external devices. The short-range communication circuit 919 is a communication circuit that communicates in compliance with the NFC, the Bluetooth and the like. The touch panel 921 is an example of an input device that enables a user to operate the smartphone 9 by touching a screen of the display 917.

The smartphone 9 further includes a bus line 910. The bus line 910 is an address bus, a data bus or the like, which electrically connects the elements in FIG. 13 such as the CPU 901.

It should be noted that a storage medium such as a CD-ROM storing any of the above-described programs and/or an HD storing any of the above-described programs can be distributed domestically or overseas as a program product.

<Functional Configuration of Embodiment>

Figure 14:
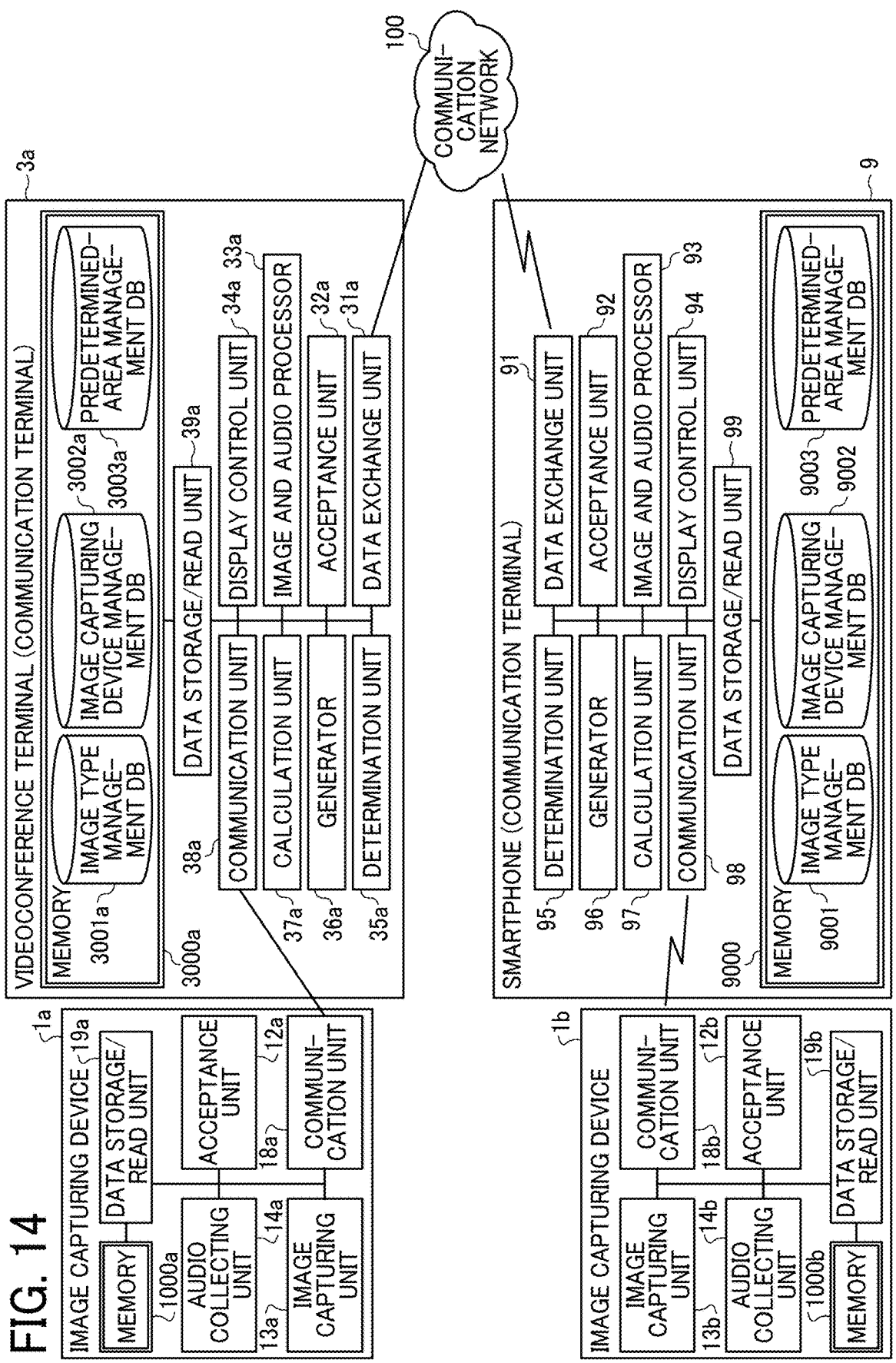
FIG. 14 is a block diagram illustrating a part of a functional configuration of the image communication system, according to an embodiment of the present disclosure.
Figure 15:
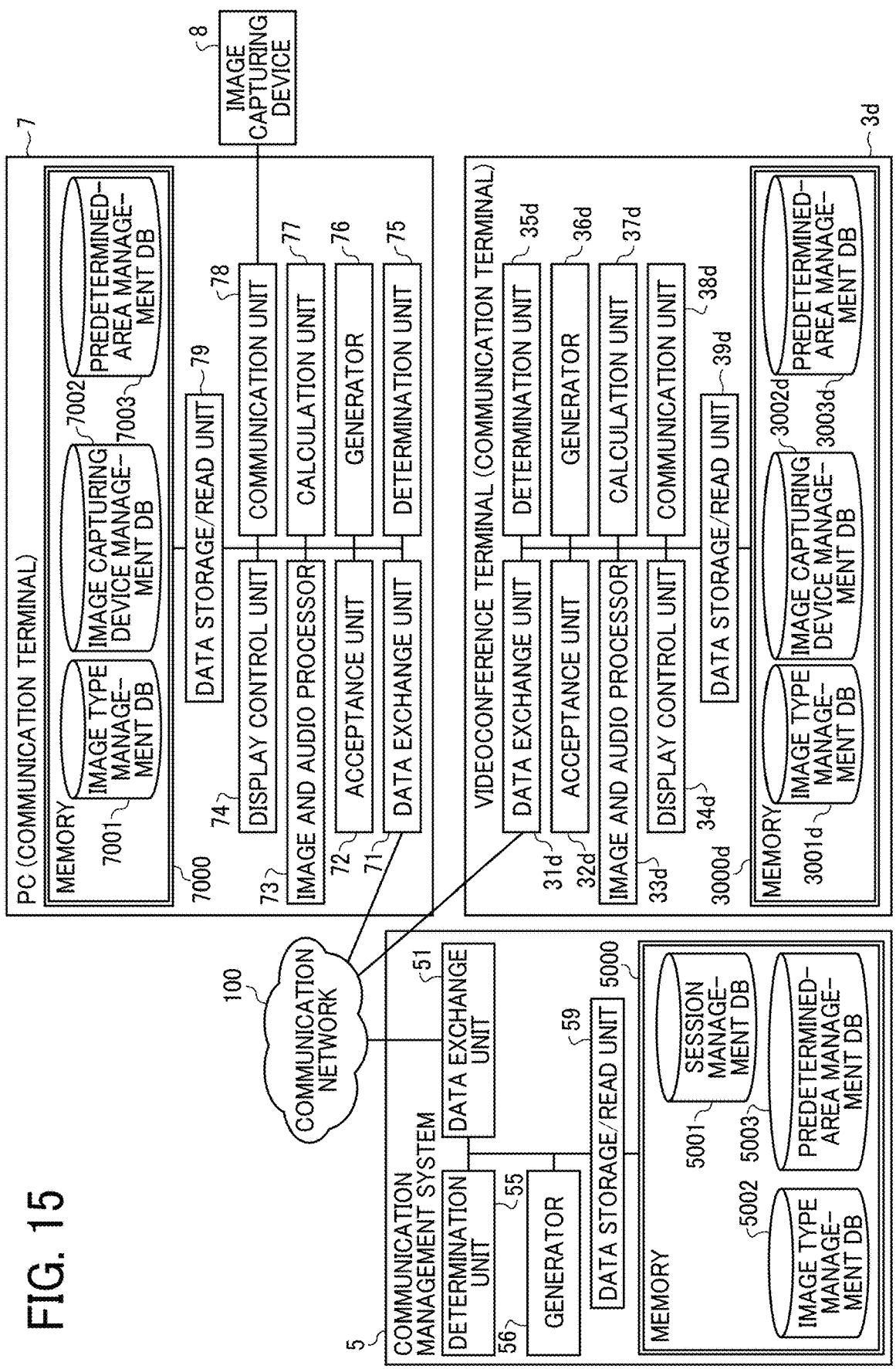
FIG. 15 is a block diagram illustrating another part of the functional configuration of the image communication system, according to an embodiment of the present disclosure.

Referring to FIGS. 14 to 20, a functional configuration of the image communication system is described according to the present embodiment. FIG. 14 and FIG. 15 are block diagrams, each illustrating a part of a functional configuration of the image communication system.

<Functional Configuration of Image Capturing Device 1a>

As illustrated in FIG. 14, the image capturing device 1a includes an acceptance unit 12a, an image capturing unit 13a, an audio collecting unit 14a, a communication unit 18a, and a data storage/read unit 19a. Each of the above-mentioned units is a function or means that is implemented by or that is caused to function by operating any one or more of the hardware elements illustrated in FIG. 10 in cooperation with instructions from the CPU 111 according to a control program for the image capturing device 1a, expanded from the SRAM 113 to the DRAM 114.

The image capturing device 1a further includes a memory 1000a, which is implemented by the ROM 112, the SRAM 113, and the DRAM 114 illustrated in FIG. 10. The memory 1000a stores therein a globally unique identifier (GUID) identifying the own device (i.e., the image capturing device 1a itself).

The image capturing device 1b includes an acceptance unit 12b, an image capturing unit 13b, an audio collecting unit 14b, a communication unit 18b, a data storage/read unit 19b, and a memory 1000b. These functional units of the image capturing device 1b implement the similar or substantially the similar functions as those of the acceptance unit 12a, the image capturing unit 13a, the audio collecting unit 14a, the communication unit 18a, the data storage/read unit 19a, and the memory 1000a of the image capturing device 1a, respectively. Therefore, redundant descriptions thereof are omitted below.

(Each Functional Unit of Image Capturing Device 1a)

Referring to FIG. 10 and FIG. 14, each of the functional units of the image capturing device 1a is described in detail.

The acceptance unit 12a of the image capturing device 1a is mainly implemented by the operation unit 115 illustrated in FIG. 10, which operates under control of the CPU 111. The acceptance unit 12a receives an instruction input from the operation unit 115 according to a user operation.

The image capturing unit 13a is implemented mainly by the imaging unit 101, the image processing unit 104, and the imaging control unit 105, illustrated in FIG. 10, each of which operates under control of the CPU 111. The image capturing unit 13a captures an image of an object or surroundings to obtain captured-image data.

The audio collecting unit 14a is mainly implemented by the microphone 108 and the audio processing unit 109 illustrated in FIG. 10, each of which operates under control of the CPU 111. The audio collecting unit 14a collects sounds around the image capturing device 1a.

The communication unit 18a, which is mainly implemented by instructions of the CPU 111, communicates data with a communication unit 38a of the videoconference terminal 3a using a short-range wireless communication network in compliance with NFC, Bluetooth, or Wi-Fi, for example.

The data storage/read unit 19a, which is mainly implemented by instructions of the CPU 111 illustrated in FIG. 10, stores various data or information in the memory 1000a or reads out various data or information from the memory 1000a.

<Functional Configuration of Videoconference Terminal 3a>

As illustrated in FIG. 14, the videoconference terminal 3a includes a data exchange unit 31a, an acceptance unit 32a, an image and audio processor 33a, a display control unit 34a, a determination unit 35a, a generator 36a, a calculation unit 37a, communication unit 38a, and a data storage/read unit 39a. Each of the above-mentioned units is a function or means that is implemented by or that is caused to function by operating any one or more of the hardware elements illustrated in FIG. 11 in cooperation with instructions from the CPU 301 according to a control program for the videoconference terminal 3a, expanded from the flash memory 304 to the RAM 303.

The videoconference terminal 3a further includes a memory 3000a, which is implemented by the ROM 302, the RAM 303, and the flash memory 304 illustrated in FIG. 11. The memory 3000a includes an image type management DB 3001a, an image capturing device management DB 3002a, and a predetermined-area management DB 3003a. Among these DBs, the image type management DB 3001*a* is implemented by an image type management table as illustrated in FIG. 16. The image capturing device management DB 3002*a* is implemented by an image capturing device management table as illustrated in FIG. 17. The predetermined-area management DB 3003*a* is implemented by a predetermined-area management table as illustrated in FIG. 18.

The videoconference terminal 3*d* includes a data exchange unit 31*d*, an acceptance unit 32*d*, an image and audio processor 33*d*, a display control unit 34*d*, a determination unit 35*d*, a generator 36*d*, a calculation unit 37*d*, a communication unit 38*d*, and a data storage/read unit 39*d*, and a memory 3000*d*. These functional units of the videoconference terminal 3*d* implement the similar of substantially the similar functions as those of the data exchange unit 31*a*, the acceptance unit 32*a*, the image and audio processor 33*a*, the display control unit 34*a*, the determination unit 35*a*, the generator 36*a*, the calculation unit 37*a*, the communication unit 38*a*, the data storage/read unit 39*a*, and the memory 3000*a* of the videoconference terminal 3*a*. Therefore, redundant descriptions thereof are omitted below. In addition, the memory 3000*d* of the videoconference terminal 3*d* includes an image type management DB 3001*d*, and an image capturing device management DB 3002*d*, and a predetermined-area management DB 3003*d*. These DBs 3001*d*, 3002*d* and 3003*d* have the same or the substantially the same data structure as the image type management DB 3001*a*, the image capturing device management DB 3002*a*, and the predetermined-area management DB 3003*a* of the videoconference terminal 3*a*, respectively. Therefore, redundant descriptions thereof are omitted below.

(Image Type Management Table)

FIG. 16 is an illustration of an example data structure of the image type management table. The image type management table stores an image data identifier (ID), an internet protocol (IP) address, which is an example of an address of a terminal as a transmission source of image data, and a source name, in association with one another. The terminal as a transmission source is hereinafter referred to as a "sender terminal". The image data ID is one example of image data identification information identifying image data to be used in video communication. An identical image data ID is assigned to image data transmitted from the same sender terminal. Accordingly, a destination terminal (that is, a communication terminal that receives image data) identifies a sender terminal from which the received image data is transmitted. An IP address of the sender terminal, which is associated with specific image data ID, is an IP address of a communication terminal that transmits image data identified by that image data ID associated with the IP address. A source name, which is associated with a specific image data ID, is a name for specifying an image capturing device that outputs the image data identified by that image data ID associated with the source name. The source name is one example of image type information. The source name is a name generated by a communication terminal such as the videoconference terminal 3*a* according to a predetermined naming rule.

The example of the image type management table illustrated in FIG. 16 indicates that four communication terminals, whose IP addresses are respectively "1.2.1.3", "1.2.2.3", "1.3.1.3", and "1.3.2.3" transmit image data identified by the image data ID "RS001", "RS002", "RS003", and "RS004", respectively. Further, according to the image type management table illustrated in FIG. 16, the image types represented by the source names of those four communication terminals are "Video_Theta", "Video_Theta", "Video", and "Video" that indicated the image types, which are "special image", "special image", "general image", and "general image", respectively. In the embodiment, the "special image" is a spherical panoramic image.

In another example, data other than the image data are stored in the image type management table in association with the image data ID. Examples of the data other than the image data include audio data and presentation material data to be shared on a screen. In addition, data other than the image data may be stored in the image type management table in association with the image data ID. Examples of the data other than the image data include audio data and presentation material data to be shared on a screen.

(Image Capturing Device Management Table)

FIG. 17 is an illustration of an example data structure of the image capturing device management table. The image capturing device management table stores a vendor ID and a product ID among the GUID of an image capturing device that is configured to obtain two hemispherical images, from which a spherical panoramic image is generated. As the GUID, a combination of a vendor ID (VID) and a product ID (PID) used in a USB device is used, for example. The vendor ID and the product ID are stored in a communication terminal such as a videoconference terminal before shipment. In another example, these IDs are added and stored in the videoconference terminal after shipment.

(Predetermined-Area Management Table)

FIG. 18 is an illustration of an example data structure of the predetermined-area management table. The predetermined-area management table stores an IP address of a communication terminal (sender terminal) as a transmission source of captured-image data representing a captured image, an IP address of a communication terminal (destination terminal) as a destination of the captured-image data, and predetermined-area information indicating a predetermined-area image being displayed at the destination terminal, in association with one another. The destination terminal of the captured-image data is identical with the sender terminal of the predetermined-area information. The predetermined-area information is a conversion parameter used to convert from a captured image to an image (predetermined-area image) of a predetermined area T of the captured image, as illustrated in FIG. 6A, FIG. 6B, and FIG. 7. The IP address is used as one example of address information. Other examples of the address information include a media access control (MAC) address and a terminal ID, which identifies a corresponding communication terminal. In the embodiment, an IPv4 address is simplified to represent the IP address. In another example, an IPv6 address is used as the IP address.

In the example of FIG. 18, the predetermined-area management table indicates, in the first line to the third line of the table, that the videoconference terminal 3*a* having an IP address of "1.2.1.3" transmits captured-image data, via the communication management system 5, to the videoconference terminal 3*d* having an IP address of "1.2.2.3", the PC 7 having an IP address of "1.3.1.3", and the smartphone 9 having an IP address of "1.3.2.3". Further, the predetermined-area management table illustrated in FIG. 18 indicates that the videoconference terminal 3*d* is a sender terminal of the predetermined-area information (r=10, θ=20, φ=30). In substantially the same manner, the predetermined-area management table indicates that the PC 7 is a sender terminal of the predetermined-area information (r=20, θ=30, φ=40). Furthermore, the predetermined-area management table indicates that the smartphone 9 is a sender terminal of the predetermined-area information (r=30, θ=40, φ=50).

When the data exchange unit 31a newly receives predetermined-area information including the same set of IP addresses of the sender terminal of captured-image data and the destination terminal of captured-image data as that currently managed in the table, the data storage/read unit 39a overwrites currently managed predetermined-area information with the newly received predetermined-area information.

(Each Functional Unit of Videoconference Terminal 3a)

Referring to FIG. 11 and FIG. 14, each of the functional units of the videoconference terminal 3a is described in detail.

The data exchange unit 31a of the videoconference terminal 3a is mainly implemented by the network I/F 311 illustrated in FIG. 11, which operates under control of the CPU 301. The data exchange unit 31a exchanges various data or information with communication management system 5 via the communication network 100.

The acceptance unit 32a is mainly implemented by the operation key 308, which operates under control of the CPU 301. The acceptance unit 32a receives selections or inputs according to a user operation. In another example, an input device such as a touch panel is used in addition to or in place of the operation key 308. For example, the acceptance unit 32a receives, from a user, designation (or selection) of display direction information, which is described below.

The image and audio processor 33a, which is implemented by instructions of the CPU 301 illustrated in FIG. 11, processes image data obtained by capturing a subject by the camera 312. After voice sound generated by a user is converted to audio signals by the microphone 314, the image and audio processor 33a performs processing on audio data based on the audio signals.

Further, the image and audio processor 33a processes image data received from another communication terminal based on the image type information such as the source name, to cause the display control unit 34a to control the display 4 to display an image based on the processed image data. More specifically, when the image type information indicates "special image", the image and audio processor 33a converts the image data such as hemispherical image data as illustrated in FIGS. 3A and 3B into spherical image data to generate spherical panoramic image data as illustrated in FIG. 4B, and further generates a predetermined-area image as illustrated in FIG. 6B. Furthermore, the image and audio processor 33a outputs, to the speaker 315, audio signals according to audio data received from another communication terminal via the communication management system 5. The speaker 315 outputs sound based on the audio signal.

The display control unit 34a is mainly implemented by the display I/F 317, which operates under control of the CPU 301. The display control unit 34a controls the display 4 to display various images or characters. For example, the display control unit 34a displays a predetermined-area image based on predetermined-area information, which is a calculation source of the display direction information for which designation (or selection) is received by the acceptance unit 32a.

The determination unit 35a, which is mainly implemented by instructions of the CPU 301, determines an image type according to image data received from, for example, the image capturing device 1a.

The generator 36a is mainly implemented by instructions of the CPU 301. The generator 36a generates a source name, which is one example of the image type information, according to the above-described naming rule, based on a determination result obtained by the determination unit 35a indicating one of a general image or a special image (the "special image" is a spherical panoramic image, in the embodiment). For example, when the determination unit 35a determines that the image type is a general image, the generator 36a generates a source name "Video" indicating a general image type. By contrast, when the determination unit 35a determines that the image type is a special image, the generator 36a generates a source name "Video_Theta" indicating a special image type.

The calculation unit 37a is mainly implemented by instructions of the CPU 301. The calculation unit 37a calculates the direction of a predetermined area T1 with respect to a predetermined area T2 in the captured image based on predetermined-area information (i2) that is information on the predetermined area T2 and predetermined-area information (i1) that is received from another communication terminal by the data exchange unit 31a. The predetermined-area information (i1) indicates the predetermined area T1 in the captured image. In the embodiment, an image displayed when the captured image is entirely displayed may be referred to as a "whole image".

The communication unit 38a is mainly implemented by the short-range communication circuit 319 and the antenna 319a, each of which operates under control of the CPU 301. The communication unit 38a communicates data with the communication unit 18a of the image capturing device 1a using a short-range wireless communication network in compliance with NFC, Bluetooth, or Wi-Fi, for example. In the above description, the communication unit 38a and the data exchange unit 31a individually have a communication unit. In another example, the communication unit 38a and the data exchange unit 31a share a single communication unit.

The data storage/read unit 39a, which is mainly implemented by instructions of the CPU 301 illustrated in FIG. 11, stores various data or information in the memory 3000 or reads out various data or information from the memory 3000.

<Functional Configuration of Communication Management System 5>

Referring to FIG. 12 and FIG. 15, each of the functional units of the communication management system 5 is described in detail. The communication management system 5 includes a data exchange unit 51, a determination unit 55, a generator 56, and a data storage/read unit 59. Each of the above-mentioned units is a function or means that is implemented by or that is caused to function by operating any one or more of the hardware elements illustrated in FIG. 12 in cooperation with instructions from the CPU 501 according to a control program for the communication management system 5, expanded from the HD 504 to the RAM 503.

The communication management system 5 further includes a memory 5000, which is implemented by the RAM 503 and the HD 504 illustrated in FIG. 12. The memory 5000 includes a session management DB 5001, an image type management DB 5002, and a predetermined-area management DB 5003. The session management DB 5001 is implemented by a session management table illustrated in FIG. 19. The image type management DB 5002 is implemented by an image type management table illustrated in FIG. 20. The predetermined-area management DB 5003 is implemented by a predetermined-area management table illustrated in FIG. 21.

(Session Management Table)

FIG. 19 is an illustration of an example data structure of the session management table. The session management table stores a session ID and an IP address of a participant communication terminal, in association with each other. The session ID is one example of session identification information for identifying a session that implements video communication. The session ID is generated for each virtual conference room. The session ID is also stored in each communication terminal such as the videoconference terminal 3a. Each communication terminal selects a desired session ID from the session ID or IDs stored therein. The IP address of the participant communication terminal indicates an IP address of the communication terminal participating in a virtual conference room identified by the associated session ID.

(Image Type Management Table)

FIG. 20 is an illustration of an example data structure of the image type management table. The image type management table illustrated in FIG. 20 stores, in addition to the information items stored in the image type management table illustrated in FIG. 16, the same session IDs as those stored in the session management table, in association with one another. The example of the image type management table illustrated in FIG. 20 indicates that three communication terminals whose IP addresses are "1.2.1.3", "1.2.2.3", and "1.3.1.3" are participating in the virtual conference room identified by the session ID "se101". The communication management system 5 stores the same image data ID, IP address of the sender terminal, and image type information as those stored in a communication terminal, such as the videoconference terminal 3a. This enables the communication management system 5 to transmit the image type information, etc., to a communication terminal that is currently participating in a video call and another communication terminal that newly participates in the video communication by entering a virtual conference room of the video communication. Accordingly, the communication terminal that is already in the video communication and the communication terminal that is newly participates in the video communication do not have to such information including the image type information.

(Predetermined-Area Management Table)

FIG. 21 is an illustration of an example data structure of the predetermined-area management table. The predetermined-area management illustrated in FIG. 21 has substantially the same data structure as the predetermined-area management table illustrated in FIG. 18. However, as described later, since the data exchange unit 51 transmits, to each communication terminal, the latest predetermined-area information at preset intervals such as every thirty seconds, all the predetermined-area information received by the data exchange unit 51 during a period from when the predetermined-area information is transmitted last time to when the most recent predetermined-area information is transmitted, is kept stored without being deleted. In the example of FIG. 21, the more recent the predetermined-area information is, the upper row in the predetermined-area management table.

(Each Functional Unit of Communication Management System 5)

Referring to FIG. 12 and FIG. 15, each of the functional units of the communication management system 5 is described in detail.

The data exchange unit 51 of the communication management system 5 is mainly implemented by the network I/F 509, which operates under control of the CPU 501 illustrated in FIG. 12. The data exchange unit 51 exchanges various data or information with the videoconference terminal 3a, the videoconference terminal 3d, or the PC 7 through the communication network 100.

The determination unit 55, which is mainly implemented by instructions of the CPU 501, performs various determinations.

The generator 56, which is mainly implemented by instructions of the CPU 501, generates an image data ID.

The data storage/read unit 59 is mainly implemented by the HDD 505 illustrated in FIG. 12, when operates under control of the CPU 501. The data storage/read unit 59 stores various data or information in the memory 5000 or reads out various data or information from the memory 5000.

<Functional Configuration of PC 7>

Referring to FIGS. 12 and 15, a functional configuration of the PC 7 is described according to the embodiment. The PC 7 has substantially the same functions as those of the videoconference terminal 3a. In other words, as illustrated in FIG. 15, the PC 7 includes a data exchange unit 71, an acceptance unit 72, an image and audio processor 73, a display control unit 74, a determination unit 75, a generator 76, a calculation unit 77, a communication unit 78, and a data storage/read unit 79. Each of the above-mentioned units is a function or means that is implemented by or that is caused to function by operating any one or more of the hardware elements illustrated in FIG. 12 in cooperation with instructions from the CPU 501 according to a control program for the PC 7, expanded from the HD 504 to the RAM 503.

The PC 7 further includes a memory 7000, which is implemented by the ROM 502, the RAM 503 and the HD 504 illustrated in FIG. 12. The memory 7000 includes an image type management DB 7001, an image capturing device management DB 7002, and a predetermined-area management DB 7003. The image type management DB 7001, the image capturing device management DB 7002, and the predetermined-area management DB 7003 have substantially the same data structure as the image type management DB 3001a, the image capturing device management DB 3002a, and the predetermined-area management DB 3003a, respectively, and redundant descriptions thereof are omitted below.

(Each Functional Unit of PC 7)

The data exchange unit 71 of the PC 7 is mainly implemented by the network I/F 509, which operates under control of the CPU 501 illustrated in FIG. 12. The data exchange unit 71 implements the similar or substantially the similar function to that of the data exchange unit 31a.

The acceptance unit 72 is mainly implemented by the keyboard 511 and the mouse 512, which operates under control of the CPU 501. The acceptance unit 72 implements the similar or substantially the similar function to that of the acceptance unit 32a. The image and audio processor 73, which is mainly implemented by instructions of the CPU 501, implements the similar or substantially the similar function to that of the image and audio processor 33a. The display control unit 74, which is mainly implemented by instructions of the CPU 501, implements the similar or substantially the similar function to that of the display control unit 34a. The determination unit 75, which is mainly implemented by instructions of the CPU 501, implements the similar or substantially the similar function to that of the determination unit 35a. The generator 76, which is mainly implemented by instructions of the CPU 501, implements the similar or substantially the similar function to that of the generator 36a. The calculation unit 77, which is mainly implemented by instructions of the CPU 501, implements the similar or substantially the similar function to that of the calculation unit 37a. The communication unit 78, which is mainly implemented by instructions of the CPU 501, implements the similar or substantially the similar function to that of the communication unit 38a. The data storage/read unit 79, which is mainly implemented by instructions of the CPU 501, stores various data or information in the memory 7000 or reads out various data or information from the memory 7000.

<Functional Configuration of Smartphone 9>

Referring to FIG. 13 and FIG. 14, a functional configuration of the smartphone 9 is described, according to the embodiment. The smartphone 9 has substantially the same functions as the videoconference terminal 3a. In other words, as illustrated in FIG. 14, the smartphone 9 includes a data exchange unit 91, an acceptance unit 92, an image and audio processor 93, a display control unit 94, a determination unit 95, a generator 96, a calculation unit 97, a communication unit 98, and a data storage/read unit 99. Each of the above-mentioned units is a function or means that is implemented by or that is caused to function by operating any one or more of the hardware elements illustrated in FIG. 13 in cooperation with instructions from the CPU 901 according to a control program for the smartphone 9, expanded from the EEPROM 904 to the RAM 903.

The smartphone 9 further includes a memory 9000, which is implemented by the ROM 902, the RAM 903, and the EEPROM 904 illustrated in FIG. 13. The memory 9000 includes an image type management DB 9001, an image capturing device management DB 9002, and a predetermined-area management DB 9003. The image type management DB 9001, the image capturing device management DB 9002, and the predetermined-area management DB 9003 have substantially the same data structure as the image type management DB 3001a, the image capturing device management DB 3002a, and the predetermined-area management DB 3003a, respectively, and redundant descriptions thereof are omitted below.

(Each Functional Unit of Smartphone 9)

The data exchange unit 91 of the smartphone 9 is mainly implemented by the long-range communication circuit 911 illustrated in the FIG. 13, which operates under control of the CPU 901. The data exchange unit 91 implements the similar or substantially the similar function to that of the data exchange unit 31a.

The acceptance unit 92 is mainly implemented by the touch panel 921, which operates under control of the CPU 901. The acceptance unit 92 implements the similar or substantially the similar function to that of the acceptance unit 32a.

The image and audio processor 93, which is mainly implemented by instructions of the CPU 901, implements the similar or substantially the similar function to that of the image and audio processor 33a. The display control unit 94, which is mainly implemented by instructions of the CPU 901, implements the similar or substantially the similar function to that of the display control unit 34a. The determination unit 95, which is mainly implemented by instructions of the CPU 901, implements the similar or substantially the similar function to that of the determination unit 35a. The generator 96, which is mainly implemented by instructions of the CPU 901, implements the similar or substantially the similar function to that of the generator 36a. The calculation unit 97, which is mainly implemented by instructions of the CPU 901, implements the similar or substantially the similar function to that of the calculation unit 37a. The communication unit 98, which is mainly implemented by instructions of the CPU 901, implements the similar or substantially the similar function to that of the communication unit 38a. The data storage/read unit 99, which is implemented by instructions of the CPU 901, stores various data or information in the memory 9000 or reads out various data or information from the memory 9000.

<Operation or Processes of Embodiment>

Referring to FIGS. 22 to 32, a description is given of an operation or processes according to the present embodiment.

<Participation Process>

Figure 22:
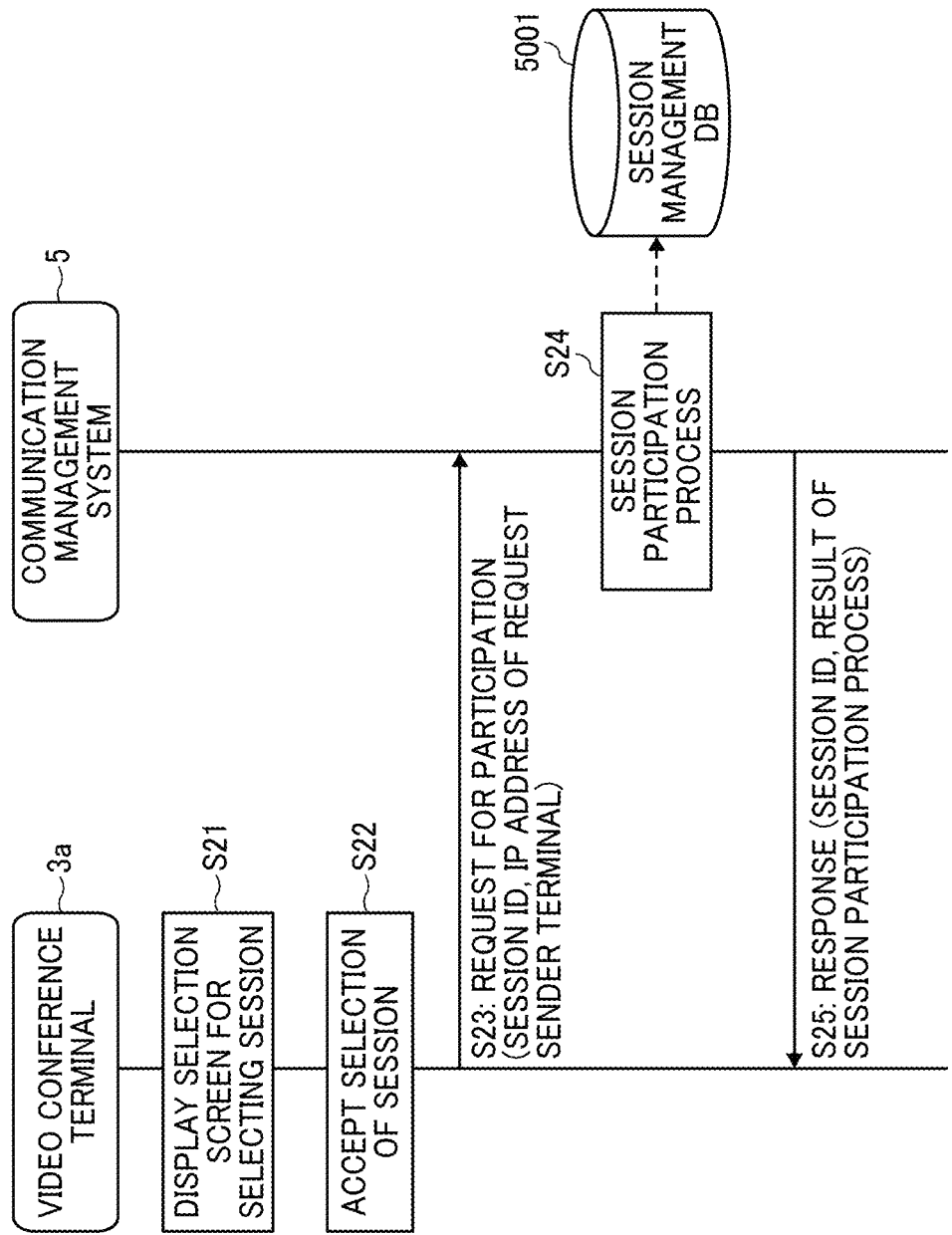
FIG. 22 is a sequence diagram illustrating an operation of participating in a specific communication session, according to an embodiment of the present disclosure.
Figure 23:
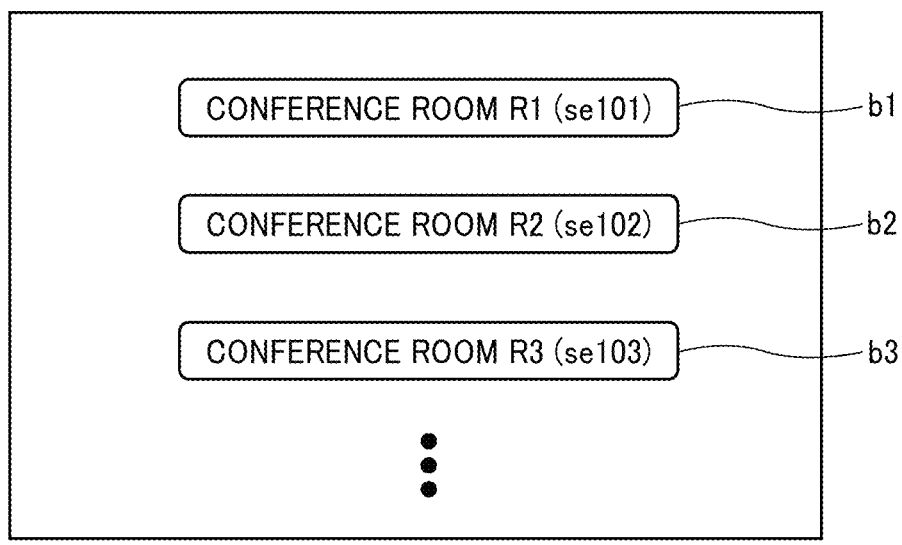
FIG. 23 is an illustration of a session selection screen for selecting a communication session (virtual conference room), according to an embodiment of the present disclosure.

Referring to FIG. 22 and FIG. 23, a participation process of participating in a specific communication session is described, according to the embodiment. FIG. 22 is a sequence diagram illustrating a participation process of participating in a specific communication session, according to the embodiment. FIG. 23 is an illustration of a session selection screen for selecting a communication session (virtual conference room), according to the embodiment.

When a user in the site A (e.g., user A1) operates the videoconference terminal 3a to display the session selection screen for selecting a desired communication session (virtual conference room), the acceptance unit 32a receives the operation to display the session selection screen. Accordingly, the display control unit 34a controls the display 4a to display the session selection screen as illustrated in FIG. 23 (step S21). In the session selection screen, selection buttons b1, b2, and b3 are displayed. The selection buttons b1, b2, and b3 respectively indicates virtual conference rooms R1, R2, R3, each of which is a selection target. Each of the selection buttons b1, b2, and b3 is associated with a corresponding session ID.

When the user A1 selects a desired selection button (in this example, the selection button b1) on the session selection screen, the acceptance unit 32a accepts selection of a corresponding communication session (step S22). Then, the data exchange unit 31a transmits a request to participate in the communication session, namely to enter the corresponding virtual conference room, to the communication management system 5 (step S23). This participation request includes the session ID identifying the communication session for which the selection is accepted at step S22, and the IP address of the videoconference terminal 3a, which is a request sender terminal. The communication management system 5 receives the participation request at the data exchange unit 51.

Next, the data storage/read unit 99 performs a process for causing the videoconference terminal 3a to participate in the communication session (step S24). More specifically, the data storage/read unit 99 adds, in the session management DB 5001 (FIG. 19), the IP address that is received at step S23 to a field of the participant terminal IP address in a record of the session ID that is the same as the session ID received at step S23. The data exchange unit 51 transmits a response to the participation request to the videoconference terminal 3a (step S25). This response to the participation request includes the session ID that is received in step S23, and a result of the participation process. The videoconference terminal 3a receives the response to the participation request at the data exchange unit 31a. The following describes a case where the process for causing the videoconference terminal 3a to participate in the communication session, namely the participation process, is successfully completed.

<Process of Managing Image Type Information>

Next, referring to FIG. 24, a management process of the image type information is described, according to the embodiment. FIG. 24 is a sequence diagram illustrating a management process of the image type information, according to the embodiment.

When a user (e.g., the user A1) in the site A connects the cradle 2a, on which the image capturing device 1a is mounted, to the videoconference terminal 3a, using a wired cable such as a USB cable, the data storage/read unit 19a of the image capturing device 1a reads out the GUID of the own device (e.g., the image capturing device 1a) from the memory 1000a. Then, the communication unit 18a transmits the own device's GUID to the communication unit 38a of the videoconference terminal 3a (step S51). The videoconference terminal 3a receives the GUID of the image capturing device 1a at the communication unit 38a.

Subsequently, the determination unit 35a of the videoconference terminal 3a determines whether a vendor ID and a product ID same as the GUID received in step S51 are stored in the image capturing device management DB 3002a (see FIG. 17) to determine the image type (step S52). More specifically, the determination unit 35a determines that the image capturing device 1a is an image capturing device that captures a special image (a spherical panoramic image, in the embodiment), based on determination that the same vender ID and product ID are stored in the image capturing device management DB 3002a. By contrast, the determination unit 35a determines that the image capturing device 1a is an image capturing device that captures a general image, based on determination that the same vender ID and product ID are not stored in the image capturing device management DB 3002a.

Next, the data storage/read unit 39a stores, in the image type management DB 3001a (FIG. 16), the IP address of the own terminal (i.e., videoconference terminal 3a), which is a sender terminal, in association with the image type information, which is a determination result determined in step S52 (step S53). In this state, the image data ID is not yet associated. Examples of the image type information include a source name, which is determined according to the naming rule, and an image type (general image or special image).

Then, the data exchange unit 31a transmits a request for addition of the image type information to the communication management system 5 (step S54). This request for addition of image type information includes the IP address of the own terminal (videoconference terminal 3a) as a sender terminal, and the image type information, both being stored in step S53 in association with each other. The communication management system 5 receives the request for addition of the image type information at the data exchange unit 51.

Next, the data storage/read unit 59 of the communication management system 5 searches the session management DB 5001 (FIG. 19) using the IP address of the sender terminal received in step S54 as a search key, to read out the session ID associated with the IP address (step S55).

Next, the generator 56 generates a unique image data ID (step S56). Then, the data storage/read unit 59 adds, in the image type management DB 5002 (FIG. 20), a new record associating the session ID that is read out in step S55, the image data ID generated in step S56, the IP address of the sender terminal and the image type information that are received in step S54, with one another (step S57). The data exchange unit 51 transmits the image data ID generated in step S56 to the videoconference terminal 3a. The videoconference terminal 3a receives the image data ID at the data exchange unit 31a (step S58).

Next, the data storage/read unit 39a of the videoconference terminal 3a stores, in the image type management DB 3001a (see FIG. 16), the image data ID received in step S58, in association with the IP address of the own terminal (i.e., videoconference terminal 3a) as the sender terminal and the image type information that are stored in step S53 (step S59).

Further, the data exchange unit 51 of the communication management system 5 transmits a notification of addition of the image type information to another communication terminal (videoconference terminal 3d in the embodiment) (step S60). This notification of addition of the image type information includes the image data ID generated in step S56, and the IP address of the own terminal (i.e., videoconference terminal 3a) as the sender terminal and the image type information that are stored in step S53. The videoconference terminal 3d receives the notification of addition of the image type information at the data exchange unit 31d. The destination of the notification transmitted by the data exchange unit 51 is indicated by an IP address associated with the session ID with which the IP address of the videoconference terminal 3a is associated in the session management DB 5001 (see FIG. 19). In other words, the destination includes other communication terminal(s) that is (are) in the same virtual conference room where the videoconference terminal 3a is participating.

Next, the data storage/read unit 39d of the videoconference terminal 3d adds, in the image type management DB 3001d (see FIG. 16), a new record associating the image data ID, the IP address of the sender terminal, and the image type information, which are received in step S60 (step S61). In substantially the same manner, the notification of addition of the image type information is transmitted to the smartphone 9 and the PC 7, each of which is another communication terminal. The smartphone 9 and the PC 7 stores the image type information, etc. in the image type management DB 9001 and the image type management DB 7001, respectively. Through the process as described above, the same information is shared among the communication terminals by being stored in the image type management DB 3001a, the image type management DB3001d, the image type management DB 7001 and the image type management DB 9001.

<Communication Process of Captured-Image Data>

Figure 25A:
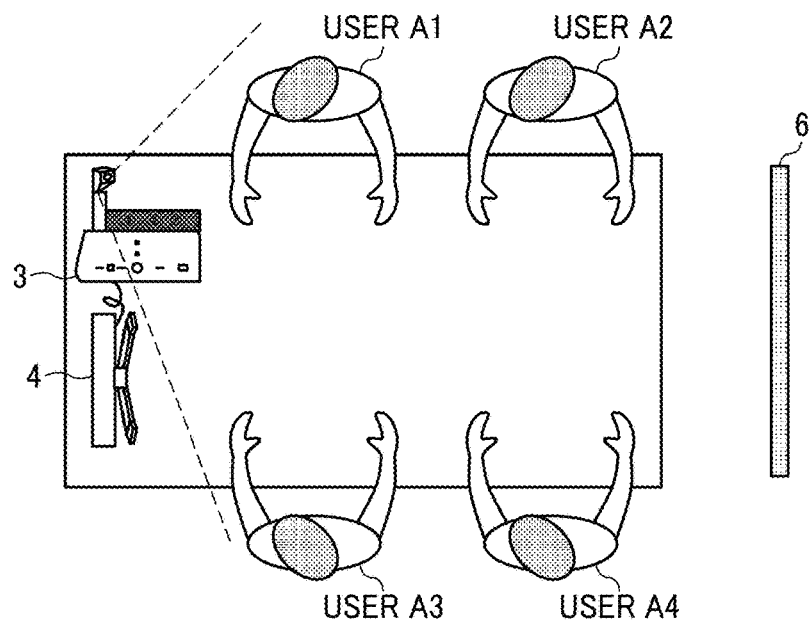
FIG. 25A is an illustration of an example state of video communication when the image capturing device of FIGS. 1A to 1C is not used, according to an embodiment of the present disclosure.
Figure 25B:
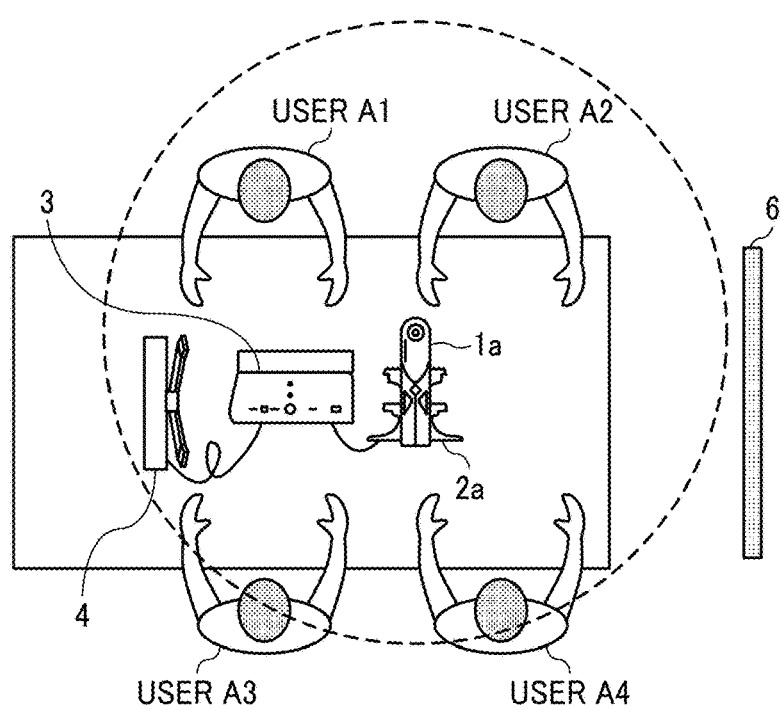
FIG. 25B is an illustration of an example state of video communication when the image capturing device of FIGS. 1A to 1C is used, according to an embodiment of the present disclosure.

Next, referring to FIGS. 25A and 25B to FIGS. 31A to 31D, a process of communicating captured-image data in video communication is described according to the embodiment. FIGS. 25A and 25B illustrate example states of video communication. More specifically, FIG. 25A illustrates a case where the image capturing device 1a is not used, while FIG. 25B illustrates a case where the image capturing device 1a is used.

As illustrated in FIG. 25A, when the camera 312 (see FIG. 11), which is built into the videoconference terminal 3a, is used and the image capturing device 1a is not used, the videoconference terminal 3a has to be placed in a corner of a table, so that images of the users A1 to A4 can be captured by the camera 312 having a field angle that is horizontally 125 degrees and vertically 70 degrees. This requires the users A1 to A4 to talk while looking in the direction of the videoconference terminal 3a. Because the user A1 to A4 look in the direction of the videoconference terminal 3a, the display 4a also has to be placed on the same side as the videoconference terminal 3a. This requires the user A2 and the user A4, who are away from the videoconference terminal 3a, to talk in a relatively loud voice, because they are away from the microphone 314 (see FIG. 11) built in the videoconference terminal 3a. Further, the user A2 and A4 have difficulty in viewing contents displayed on the display 4a.

By contrast, as illustrated in FIG. 25B, when the image capturing device 1a is used, the videoconference terminal 3a and the display 4a are allowed to be placed relatively in the center of the table, because the image capturing device 1a is configured to obtain two hemispherical images, from which a spherical panoramic image is generated. Comparing with the case where the image capturing device 1a is not used as illustrated in FIG. 25A, the users A1 to A4 can talk with a relatively small volume, because they are closer to the microphone 314. Further, it gets easier for the users A1 to A4 to view contents displayed on the display 4a. In addition, in the right side of the site A, a whiteboard 6 is provided, on which the users A1 to A4 can write characters or images.

Figure 26:
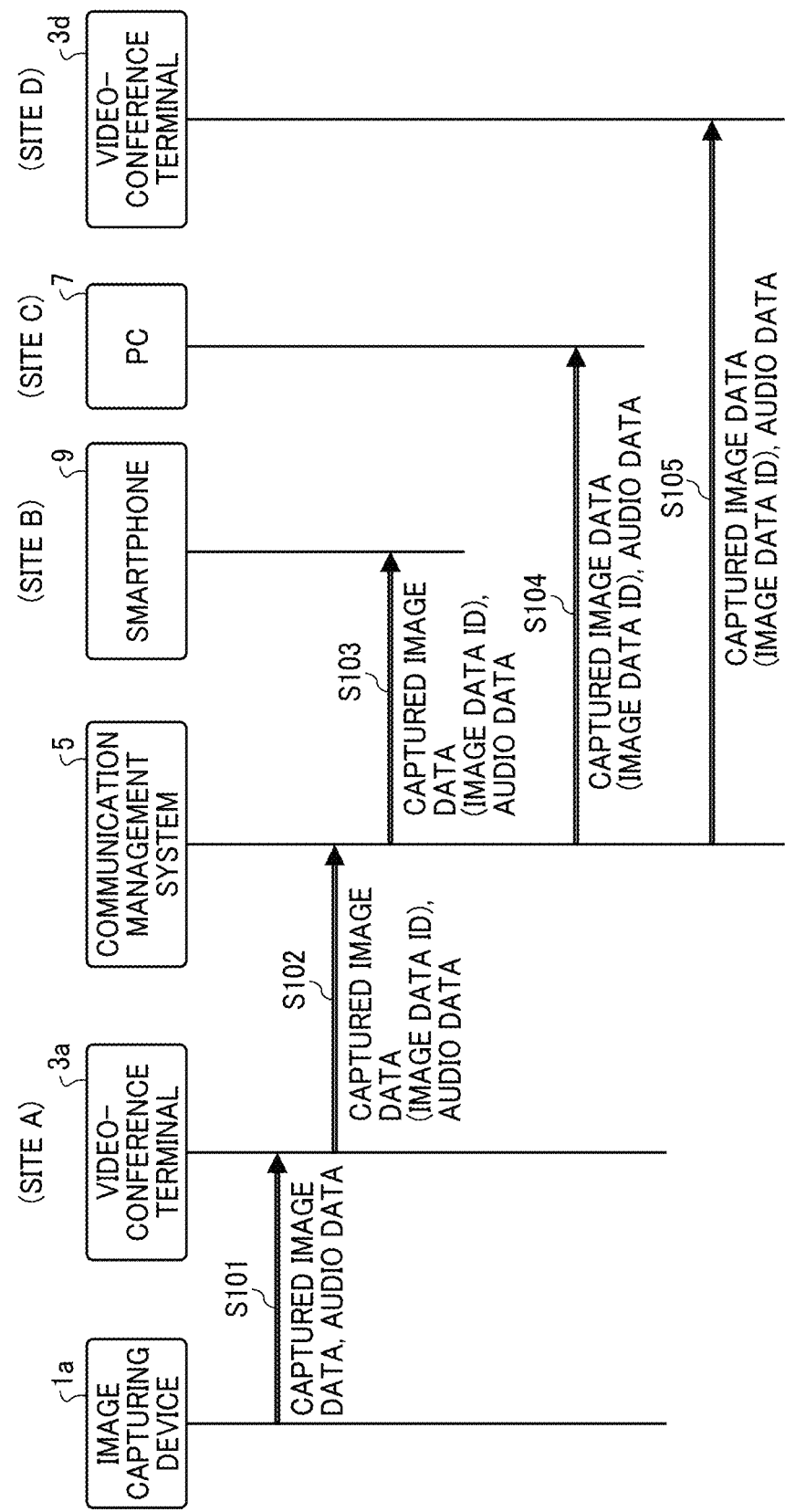
FIG. 26 is a sequence diagram illustrating an operation of transmitting captured-image data and audio data in video communication, according to an embodiment of the present disclosure.

Referring to FIG. 26, a description is given of a process of transmitting captured-image data and audio data obtained in the site A illustrated in FIG. 25B to other communication terminals (smartphone 9, PC 7, and videoconference terminal 3d) via the communication management system 5, according to the embodiment. FIG. 26 is a sequence diagram illustrating the process of transmitting captured-image data and audio data in video communication, according to the embodiment.

The communication unit 18a of the image capturing device 1a transmits captured-image data obtained by capturing a subject or surrounding and audio data obtained by collecting sound to the communication unit 38a of the videoconference terminal 3a (step S101). Because the image capturing device 1a is a device that is configured to obtain two hemispherical images, from which a spherical panoramic image is generated, the captured-image data is configured by data of the two hemispherical images as illustrated in FIG. 3A and FIG. 3B. The videoconference terminal 3a receives the captured-image data at the communication unit 38a.

Next, the data exchange unit 31a of the videoconference terminal 3a transmits, to the communication management system 5, the captured-image data and the audio data received from the image capturing device 1a (step S102). Along with the captured-image data and the audio data, an image data ID identifying the captured image data, which is a transmission target, is also transmitted. The communication management system 5 receives the captured-image data and the image data ID at the data exchange unit 51.

Next, the data exchange unit 51 of the communication management system 5 transmits the captured-image data and the audio data to other participant communication terminal (i.e., smartphone 9, the PC 7, and the videoconference terminal 3d) participating in the same video communication in which the videoconference terminal 3a is participating (steps S103, S104, S105). At each of these steps, along with the captured-image data and the audio data, the image data ID identifying the captured-image data, which is a transmission target, is also transmitted. The smartphone 9, the PC 7 and the videoconference terminal 3d receives the captured-image data, the image data ID and the audio data, at the data exchange unit 91, the data exchange unit 71, and the data exchange unit 31d.

Figure 27A:
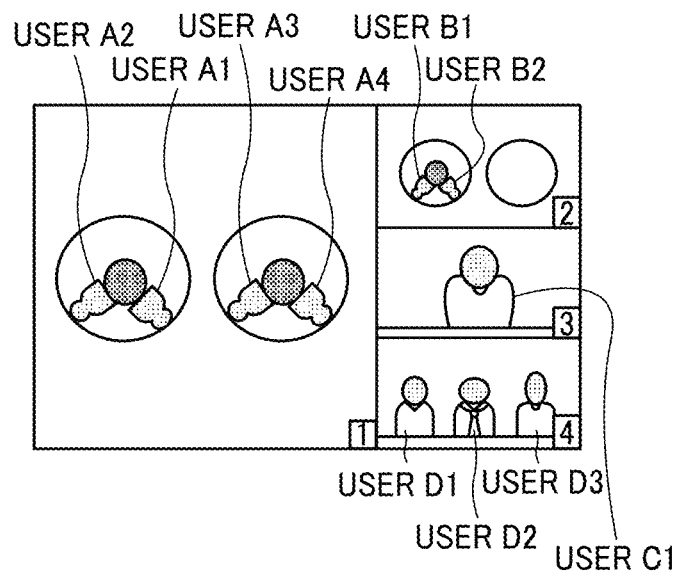
FIG. 27A is an illustration of an example of a content displayed in one site, in which image data transmitted from the image capturing device of FIGS. 1A to 1C is displayed as is, that is, without generating a spherical panoramic image and a predetermined-area image, according to an embodiment of the present disclosure.
Figure 27B:
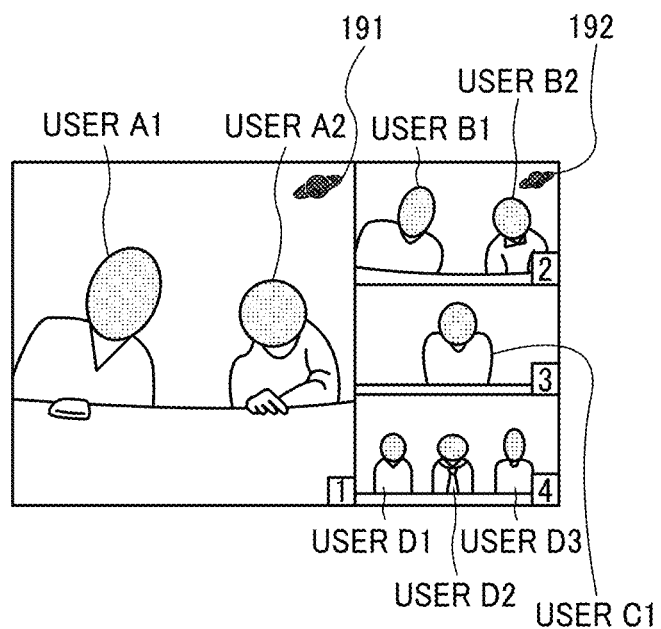
FIG. 27B is an illustration of an example of a content displayed in one site, in which a spherical panoramic image and a predetermined-area image are generated based on image data transmitted from the image capturing device of FIGS. 1A to 1C, according to an embodiment of the present disclosure.
Figure 27C:
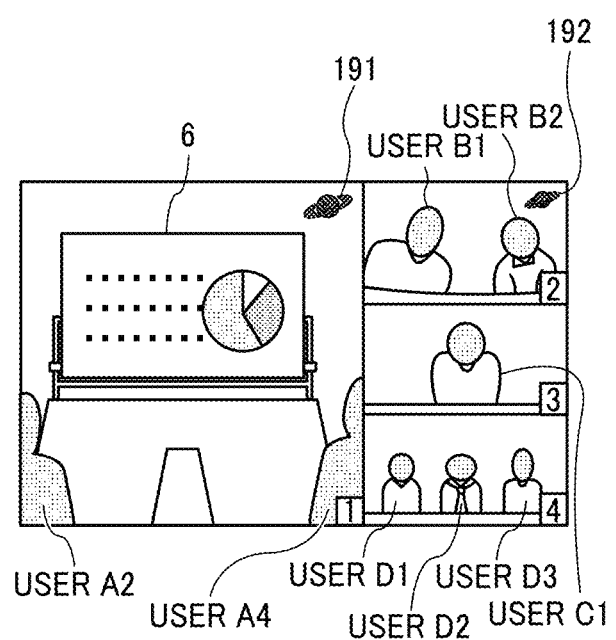
FIG. 27C is an illustration of an example of a content displayed in one site, in which the predetermined-area image of FIG. 27B is changed, according to an embodiment of the present disclosure.

Next, referring to FIGS. 27A, 27B and 27C, display examples on the display 917 in the site B are described, according to the embodiment. FIGS. 27A, 27B, and 27C are views, each illustrating a display example on the display 917 in the site B, according to the embodiment. FIG. 27A is an illustration of a screen displayed in the site B, in which the screen includes an image based on captured-image data transmitted from the image capturing device 1a in the site A via the videoconference terminal 3a, and another image based on captured image-data transmitted from the image capturing device 1b in the site B, without generating a spherical panoramic image and a predetermined-area image. By contrast, FIG. 27B is an illustration of a screen displayed in the site B, in which the screen includes images that are displayed after a spherical panoramic image and a predetermined-area image are generated based on the captured-image data transmitted from the image capturing device 1a in the site A and the image capturing device 1b in the site B. In the example of FIG. 27A to FIG. 27C, an image of the site A is displayed in a left-side display area (layout number "1") of the display 917, and an image of the site B (own site) is displayed in an upper-right display area (layout number "2"). Further, in a middle-right display area (layout number "3") of the display 917, an image of the site C is displayed, and an image of the site D is displayed in a lower-right display area (layout number "4"). The display area having the layout number "1" is a main display area, and the display areas with the layout numbers "2", "3" and "4" are sub display areas. An image to be displayed in the main display area and an image to be displayed in the sub display area can be switched in each communication terminal. In general, an image having a main person in the video communication is displayed in the main display area at each site.

When captured-image data transmitted from the image capturing device 1a and the image capturing device 1b, each being configured to capture a spherical panoramic image, are displayed as they are, the images of the site A and the site B are displayed as illustrated in FIG. 27A, i.e., each image is displayed as a combination of a hemispherical image on the front side and a hemispherical image on the back side, as respectively illustrated in FIG. 3A and FIG. 3B.

On the other hand, when the image and audio processor 93 generates a spherical panoramic image based on each of the captured-image data transmitted from the image capturing device 1a and the image capturing device 1b, each of which is configured to obtain two hemispherical images from which a spherical panoramic image is generated, and further generates a predetermined-area image, the predetermined-area image, which is a planar image, is displayed as illustrated in FIG. 27B. Further, in both of FIGS. 27A and 27B, a general image (planar image, in this example) is displayed in each of the display areas of the site C and site D, because the image capturing device 8 and the camera 312 built in the videoconference terminal 3d, each being an image capturing device that obtains a general image, are used in the site C and the site D, respectively.

Furthermore, a user in each site can change a predetermined area corresponding to the predetermined-area image in the same spherical panoramic image. For example, when the user B1 operates using the touch panel 921, the acceptance unit 92 receives the user operation to shift the predetermined-area image, and the display control unit 94 shifts, rotates, reduces, or enlarges the predetermined-area image. Thereby, a default predetermined-area image in which the user A1 and the user A2 are displayed as illustrated in FIG. 27B, is changeable to another predetermined-area image as illustrated in FIG. 27C, for example. More specifically, in FIG. 27C, the predetermined-area image is changed from one including the users A1 and A2 to another one including the whiteboard 6, in the captured image of the site A as illustrated in FIG. 25B.

Sphere icons 191 and 192 illustrated in FIGS. 27B and 27C are examples of a special image identification icon indicating that an image being displayed is a predetermined-area image corresponding to the predetermined area T, which is a part of a spherical panoramic image. Although in examples of FIGS. 27B and 27C, each of the sphere icons 191 and 192 is displayed in an upper right corner, in another example, each of the sphere icons 191 and 192 is displayed at any other suitable position such as in an upper left corner, a lower left corner, a lower right corner. In addition, a type of each of the sphere icons 191 and 192 is not limited to the one illustrated in FIG. 27B and FIG. 27C. Further, in alternative to or in addition to the sphere icons 191 and 192, a character string such as "Spherical Image", or a combination of an icon and characters can be used.

Referring to FIG. 28, an operation performed by the image communication system is described, when a predetermined-area image as illustrated in FIG. 27B is displayed and the predetermined-area image is changed from the one illustrated in FIG. 27B to another one illustrated in FIG. 27C. FIG. 28 is a sequence diagram illustrating an operation of sharing predetermined-area information. In FIG. 28, the videoconference terminal 3a in the site A is an example of a third communication terminal, the videoconference terminal 3d in the site D is an example of another communication terminal, and the smartphone 9 in the site B is an example of the communication terminal (own terminal).

First, when the user D1, D2 or D3 operates the videoconference terminal 3d in the site D to display the predetermined-area image of the site A as illustrated in FIG. 27B, the data exchange unit 31d of the videoconference terminal 3d transmits, to the communication management system 5, predetermined-area information indicating the predetermined-area image currently being displayed (step S111). This predetermined-area information includes the IP address of the videoconference terminal 3a, which is a sender terminal of the captured-image data and the IP address of the videoconference terminal 3d, which is a destination terminal of the captured-image data. In this example, the videoconference terminal 3d is also a sender terminal of the predetermined-area information. The communication management system 5 receives the predetermined-area information at the data exchange unit 51.

The data storage/read unit 59 of the communication management system 5 stores, in the predetermined-area management DB 5003, the predetermined-area information and the IP address of the sender terminal and the IP address of the destination terminal, which are received at step S111, in association with one another (step S112). The processes in steps S111 and 112 are performed each time the predetermined-area image is changed in the videoconference terminal 3d, for example, from the one as illustrated in FIG. 27B to another one as illustrated in FIG. 27C.

The data storage/read unit 59 of the communication management system 5 reads out, from a plurality of sets of the predetermined-area information and the IP address of each of the sender terminal and the destination terminal stored in the predetermined-area management DB 5003, the latest (the most recently stored) set of predetermined-area information and the IP address of each of the sender terminal and the destination terminal, at preset intervals such as every thirty seconds (step S113). Next, the data exchange unit 51 distributes (transmits) the predetermined-area information and the IP addresses read in step S113, to other communication terminals (the videoconference terminal 3a, the smartphone 9, the PC 7) participating in the same video communication in which the videoconference terminal 3d, which is the sender terminal of the predetermined-area information, is participating (steps S114, S116, S118). The videoconference terminal 3a receives the predetermined-area information at the data exchange unit 31a. The data storage/read unit 39a stores the predetermined-area information and the IP addresses received in step S114 in association with one another in the predetermined-area management DB 3003a (step S115). In substantially the same manner, the smartphone 9 receives the predetermined-area information at the data exchange unit 91. The data storage/read unit 99 stores the predetermined-area information and the IP addresses received in step S116 in association with one another in the predetermined-area management DB 9003 (step S117). Further, PC 7 receives the predetermined-area information at the data exchange unit 71. The data storage/read unit 79 stores, in the predetermined-area management DB 7003, the predetermined-area information received in step S118 in association with the IP addresses that are also received in step S118 (step S119).

Thus, the predetermined-area information indicating the predetermined-area image changed in the site A is transmitted to each of the communication terminals in the other sites B, C and D participating in the same video communication. As a result, the predetermined-area information indicating the predetermined-area image being displayed in the site A is shared by the other communication terminals in the other sites B, C and D. This operation is performed in substantially the same manner, when the predetermined-area image being displayed at any one of the communication terminals in the sites B, C, and D is changed. Accordingly, the predetermined-area information indicating the predetermined-area image being displayed by the communication terminal in any one of the sites is shared by the other communication terminals in the other sites which are participating in the same video communication.

Figure 29:
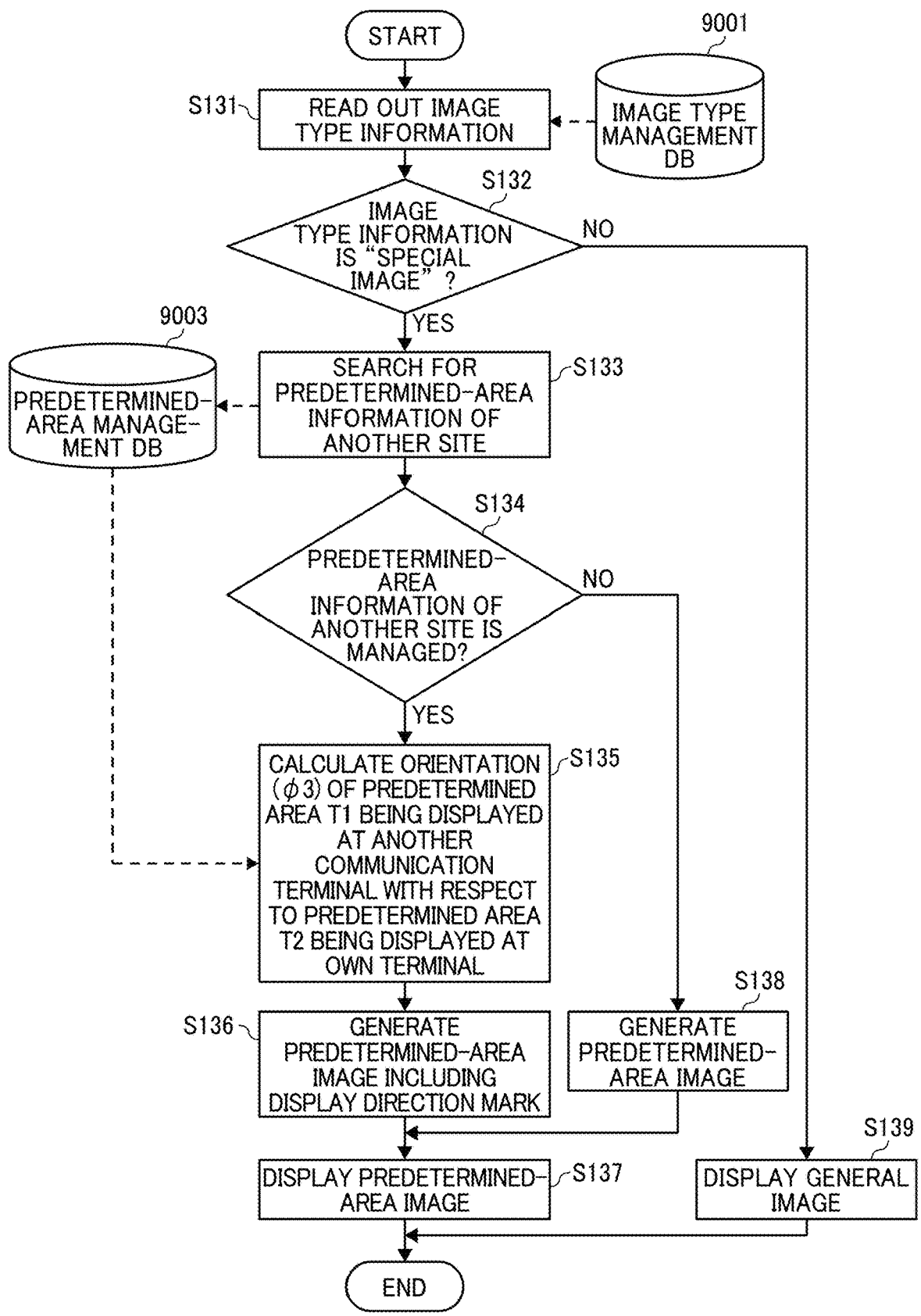
FIG. 29 is a flowchart illustrating steps in an operation of displaying the predetermined-area image, according to an embodiment of the present disclosure.

Referring to FIG. 29, FIG. 30, and FIGS. 31A to 31D, a description is given of using the predetermined-area information shared by the communication terminals in the remote sites, according to the embodiment. FIG. 29 is a flowchart illustrating steps in an operation of displaying a predetermined-area image, according to the embodiment. Since the same or the substantially the same operation is performed at each of the communication terminals (smartphone 9, the PC 7, videoconference terminal 3a, and videoconference terminal 3d), an operation performed by the smartphone 9 in the site B is described, as an example. More specifically, a description is given of an operation performed by the smartphone 9 in the site B, when the videoconference terminal 3d in the site D displays a predetermined-area image based on captured-image data transmitted from the videoconference terminal 3a in the site A, and the videoconference terminal 3d transmits predetermined-area information indicating the predetermined-area image to other communication terminals participating in the same video communication.

First, the data storage/read unit 99 of the smartphone 9 searches the image type management DB 9001 (FIG. 16) using the image data ID received in step S103 in the process illustrated in FIG. 26 as a search key, to read out the image type information (source name) associated with the image data ID (step S131).

Next, the determination unit 95 determines whether the image type information read in step S131 indicates "special image" or not (S132). When the image type information read in step S131 indicates "special image" (S132: YES), the data storage/read unit 99 searches the predetermined-area management DB 9003 for predetermined-area information indicating a predetermined-area image being displayed by each of the communication terminals in the other sites (step S133). Next, the determination unit 95 determines whether the predetermined-area information indicating the predetermined-area image being displayed by each of the communication terminals in the other sites is managed in the predetermined-area management DB 9003 (step S134). When the predetermined-area information indicating the predetermined-area image being displayed by each of the communication terminals in the other sites is managed in the predetermined-area management DB 9003 (S134: YES), the calculation unit 97 calculates a direction (a rotation angle φ3) of a predetermined area T2 with respect to a predetermined area T1 in a whole image, based on predetermined-area information (i2) indicating the predetermined-area image of the predetermined area T2 displayed by the smartphone 9 (own terminal) and the predetermined-area information (i1) indicating the predetermined-area image of the predetermined area T1, which information (i1) is received by the data exchange unit 91 from another communication terminal and is stored in the predetermined-area management DB 9003 (step S135).

Figure 30:
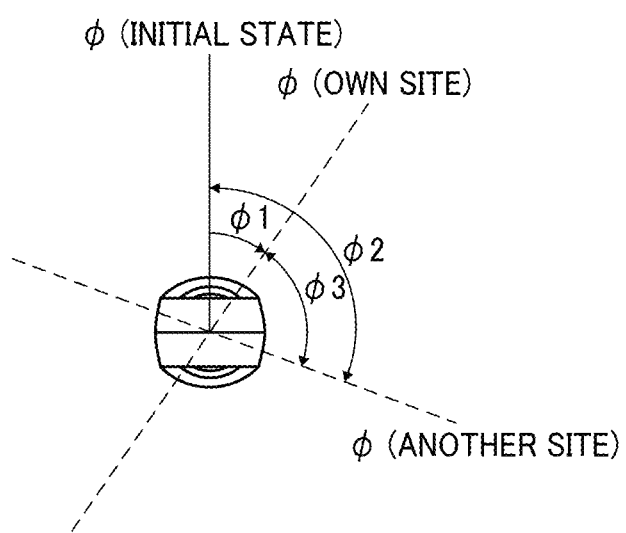
FIG. 30 is an illustration for explaining definition of angles, according to an embodiment of the present disclosure.

Referring to FIG. 30, a description is given of how the direction (the rotation angle φ3) of the predetermined area T1 with respect to the predetermined area T2 in the whole image is calculated. FIG. 30 is an illustration for explaining definitions of angles, according to the embodiment.

As illustrated in FIG. 30, the calculation unit 97 acquires an azimuth angle φ from the predetermined-area information indicating the predetermined-area image being displayed by the display control unit 94 of the own terminal (smartphone 9), and sets this azimuth angle φ as a rotation angle φ1. Next, the calculation unit 97 acquires an azimuth angle φ from the predetermined-area information read out in the step S133 (the predetermined-area information indicating the predetermined-area image being displayed by each of the communication terminals in the other sites), and sets this azimuth angle as a rotation angle φ2. Further, the calculation unit 97 calculates the difference between the rotation angle φ2 and the rotation angle φ1, and sets this difference as the rotation angle φ3.

Next, the image and audio processor 93 generates a predetermined-area image including display direction information indicating the direction calculated by the calculation unit 97 (step S136). At this step, based on the image type information indicating the "special image", the image and audio processor 93 combines each of the sphere icons 191 and 192 indicating a spherical panoramic image with each of the predetermined-area images. Then, as illustrated in FIGS. 31A, 31B, 31C and 31D, the display control unit 94 displays the predetermined-area image generated in step S136 (step S137).

Figure 31A:
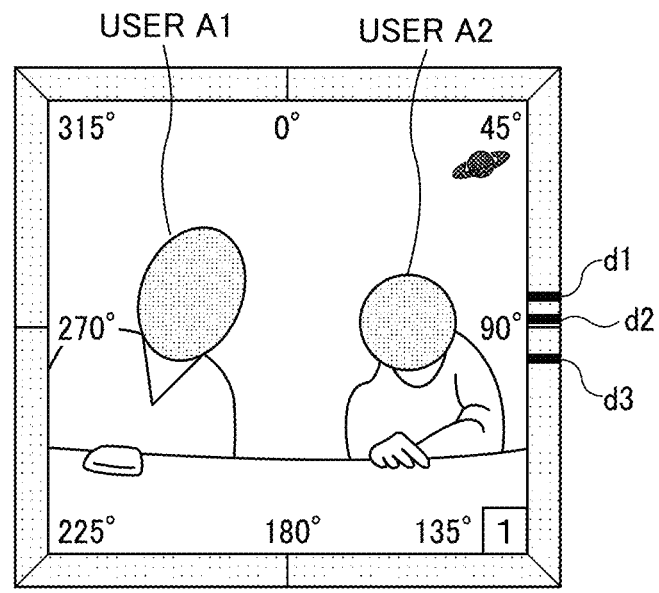
FIGS. 31A to 31D are views, each illustrating a display example of the predetermined-area image including display direction information, according to an embodiment of the present disclosure.
Figure 31B:
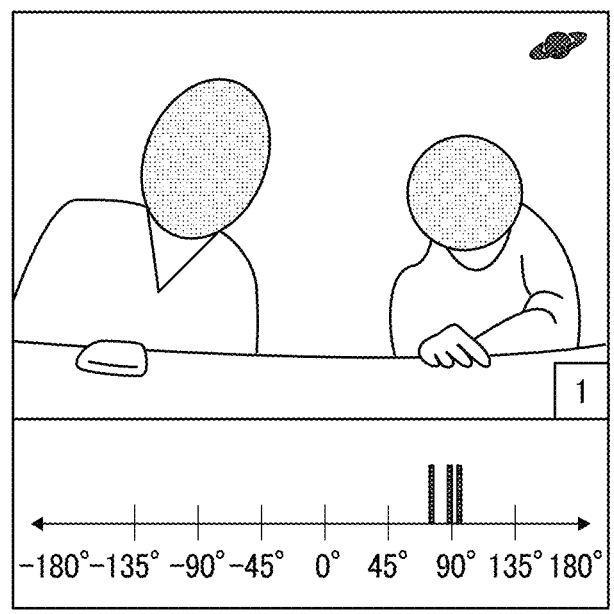
Figure 31C:
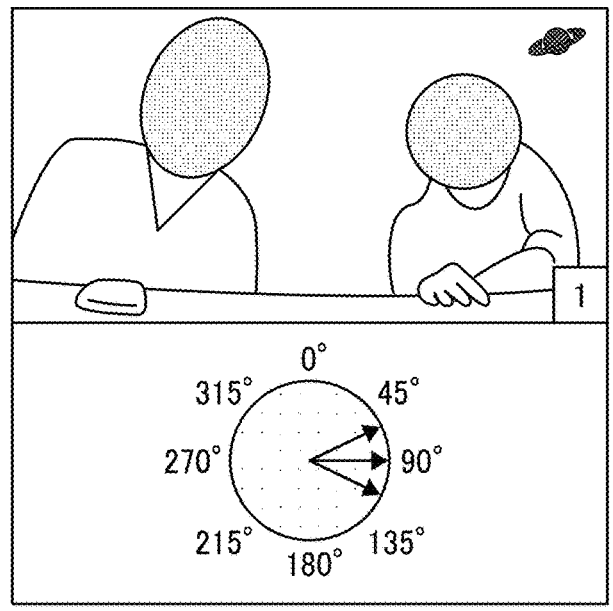
Figure 31D:
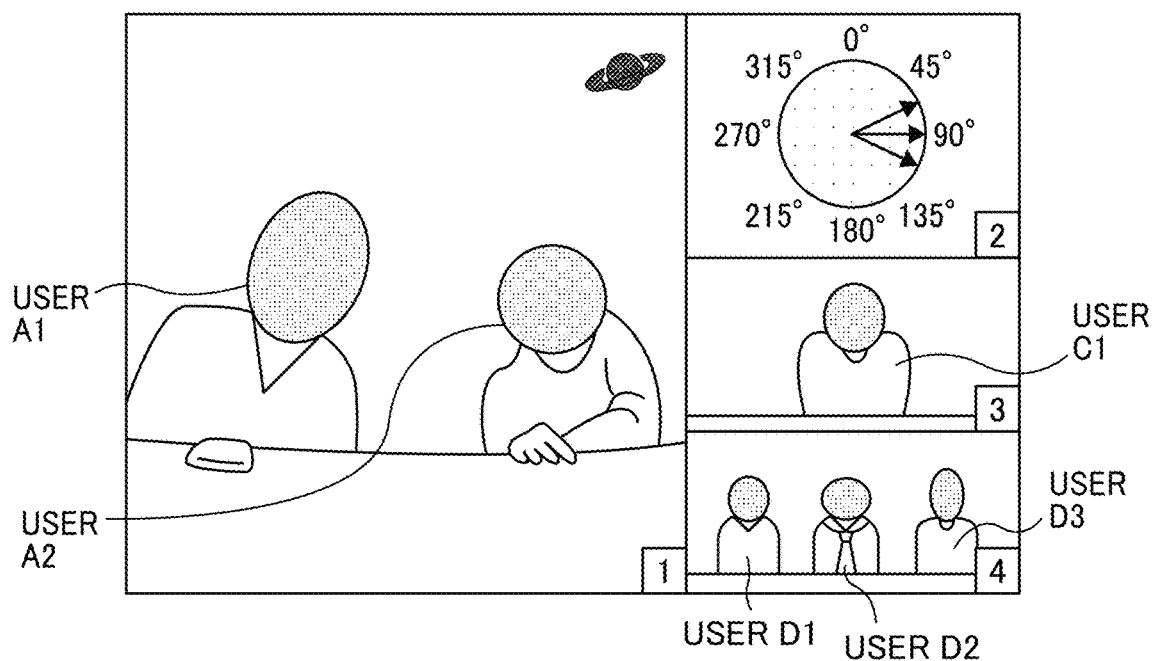

Referring to FIGS. 31A to 31D, several examples of display direction information are described. In each example, a direction of each of the predetermined areas T1 with respect to the predetermined area T2 in a whole image (sphere CS) transmitted from the videoconference terminal 3a in the site A is displayed. In these examples, each of the predetermined areas T1 corresponds to predetermined-area image being displayed by each of the communication terminals in the other sites, and the predetermined area T2 corresponds to a predetermined-area image being displayed by the own terminal (smartphone 9). In each example, the direction of the predetermined area T2 of the predetermined-area image being displayed by the own terminal (smartphone 9) is set to 0°. FIGS. 31A, 31B, and 31C are views, each illustrating a display example of the predetermined-area image including display direction information, which image is displayed in the main display area. FIG. 31D is a view illustrating a display example displayed in an entire display area including the main display area and sub display areas.

FIG. 31A illustrates a first example of the display direction information. In the example of FIG. 31A, a plurality pieces of the display direction information are displayed around the periphery of predetermined-area image. Each of the display direction information d1, d2, d3 is represented by a bar. The number of bars corresponds to the number of the other communication terminals participating in the same video communication in which the smartphone 9 is participating. In the example of FIG. 31A, angles are displayed clockwise at intervals of 45 degrees. Although FIG. 31A illustrates a display example including numerical values indicating angles for the sake of explanatory convenience, such numerical values can be omitted on the display in fact. The concentration of the predetermined-area images being displayed by the other communication terminals is in a range where the rotation angle φ3 is around 90°. The users B1 and B2 viewing this predetermined-area image including the display direction information can recognize that, in the whole image, images to which attention is paid in the other sites are present near 90° with respect to the predetermined-area image being displayed on the display 917 of the own (smartphone 9). Each bar can be displayed in any suitable color.

FIG. 31B illustrates a second example of the display direction information. In FIG. 31B, a plurality pieces of display direction information are displayed on a one-dimensional graph in a lower area of a display area for the predetermined-area image. Similarly to the first example illustrated in FIG. 31A, each of the display direction information is represented by a bar. The number of bars corresponds to the number of the other communication terminals participating in the same video communication. Also similarly to the first example illustrated in FIG. 31A, the concentration of the predetermined-area images being displayed by the other communication terminals is in a range where the rotation angle φ3 is around 90°. Each bar can be displayed in any suitable color.

FIG. 31C illustrates a third example of the display direction information. In FIG. 31C, a plurality pieces of display direction information are displayed on a circle graph in a lower area of a display area for the predetermined-area image. In this case, each display direction information is represented by an arrow in a circle including indications from 0° to 360°. The number of arrows corresponds to the number of the other communication terminals participating in the same video communication. For example, in FIG. 31C, the concentration of the predetermined-area images being displayed by the other communication terminals is in a range where the rotation angle φ3 is around 90°. Each arrow can be displayed in any suitable color.

FIG. 31D illustrates a fourth example of the display direction information. In FIG. 31D, the circle graph illustrated in FIG. 31D is displayed in an upper-right display area (layout number 2) of the display 917, in which display area an image of the own site (site B) is to be displayed. Since the priority of viewing the image of the own site is lower than viewing the images of the other sites, the replacement of the image of the own site with another image such as an image of the circle graph is less likely to disturb the participants in the video communication from communicating with each other.

Figure 32:
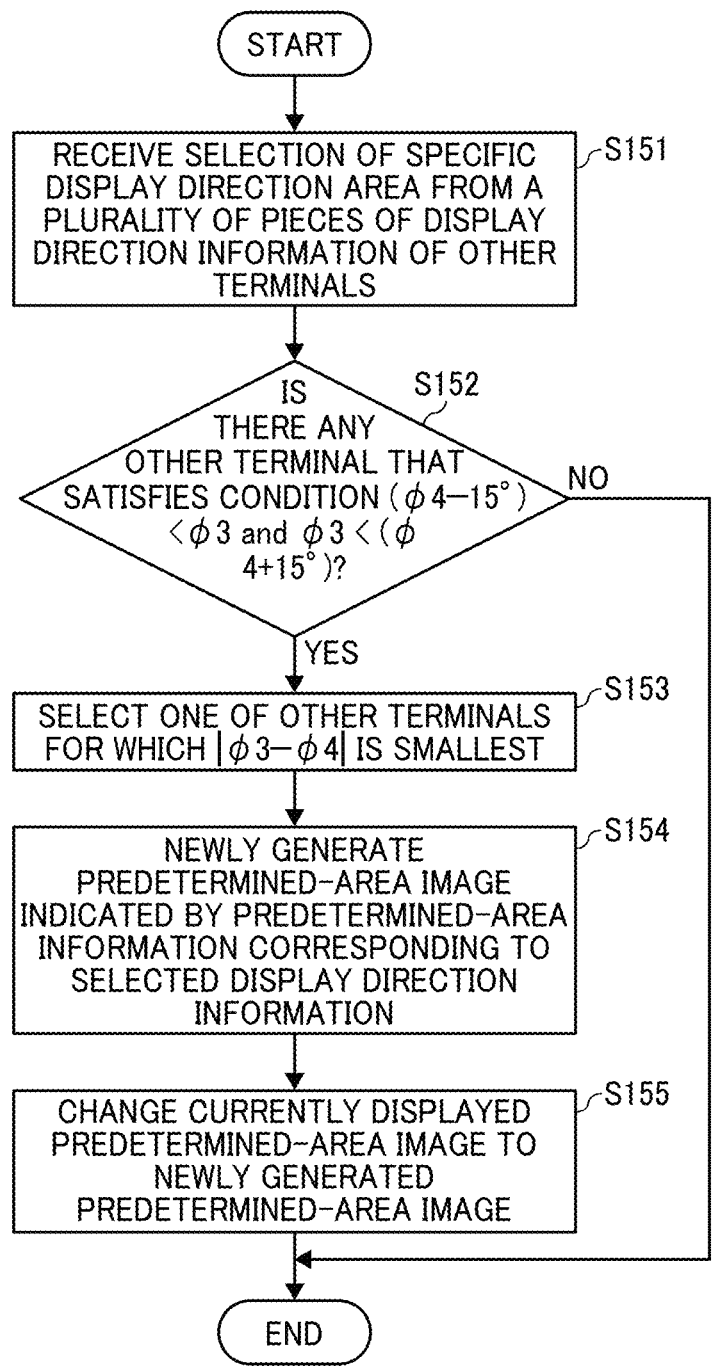
FIG. 32 is a flowchart illustrating steps in an operation, performed by the own terminal, of displaying the predetermined-area image being displayed by another communication terminal, according to an embodiment of the present disclosure.

Next, referring to FIG. 32, a description is given of an operation of displaying a predetermined-area image being displayed by another communication terminal at the own terminal, according to the embodiment. FIG. 32 is a flowchart illustrating steps in an operation, performed by the own terminal, of displaying the predetermined-area image being displayed by another communication terminal, according to the embodiment. More specifically, a description is given of an operation for displaying, on the display 917 of the smartphone 9, a desired predetermined-area image that the user B1 in the site B wants to be displayed, among predetermined-area images corresponding to the plurality of pieces of display direction information illustrated in FIG. 31A.

First, in the site B, the user B1 presses particular display direction information or near the particular display direction information by using the touch panel 921, among the plurality of pieces of display direction information d1, d2, d3 illustrated in FIG. 31A. In response to this operation by the user B, the acceptance unit 92 accepts selection of an angle indicated by the pressed position (step S151). In the embodiment, the angle indicated by the pressed position is assumed as a rotation angle $\varphi 4$.

Next, the determination unit 95 determines whether any one or more of the rotation angles $\varphi 3$ indicated by the display direction information d1, d2, d3 is within a range from minus 15° to plus 15° with respect to the rotation angle $\varphi 4$, based on the following equation 2 (step 152).

$$\Phi 4-15°)<\varphi 3<(\varphi 4+15°) \qquad \text{(Equation 2)}$$

When the determination unit 95 determines that any one or more of the rotation angles $\varphi 3$ is within a range from minus 15° to plus 15° with respect to the rotation angle $\varphi 4$ (step S152: YES), the calculation unit 97 selects one of the plurality pieces of display direction information corresponding to the rotation angle $\varphi 3$ for which a value obtained by the following Equation 3 is smallest (step S153).

$$|\varphi 3-\varphi 4| \qquad \text{(Equation 3)}$$

Next, the image and audio processor 93 newly generates a predetermined-area image indicated by predetermined-area information corresponding to the display direction information selected in step S153 (step S154). Further, the display control unit 94 controls the display 917 to change from a predetermined-area image currently being displayed to the new predetermined-area image generated in step S154 (step S155). As a result, for example, a currently-displayed predetermined-area image in which the user A1 and the user A2 are displayed as illustrated in FIG. 31A is changed to the new predetermined-area image in which the whiteboard 6 is displayed as illustrated in FIG. 27C. When the image and audio processor 93 generates the new predetermined-area image, only an azimuth angle $\varphi$ of the selected display direction information is applied among the predetermined-area information, and a moving radius r and a polar angle $\theta$ can be the same as those of the currently-displayed predetermined-area image.

By contrast, the determination unit 95 determines that the rotation angles $\varphi 3$ are outside a range from minus 15° to plus 15° with respect to the rotation angle $\varphi 4$ (step S152: NO), the predetermined-area image as illustrated in FIG. 31A remains displayed.

In another example, when the user B1 viewing the display direction information d1, d2 and d3 recognizes that users in the other sites (sites A, C and D) are paying attention to the right direction with respect to the predetermined-area image currently being displayed in the own site (site B), the user B can shift the predetermined-area image by about 90° by operating the touch panel 921 of the smartphone 9, instead of pressing any one of the display direction information d1, d2 and d3 illustrated in FIG. 31A. As a result, the user B1 can view an image to which the users in the other sites are paying attention with a manual operation.

Second Embodiment

Figure 33:
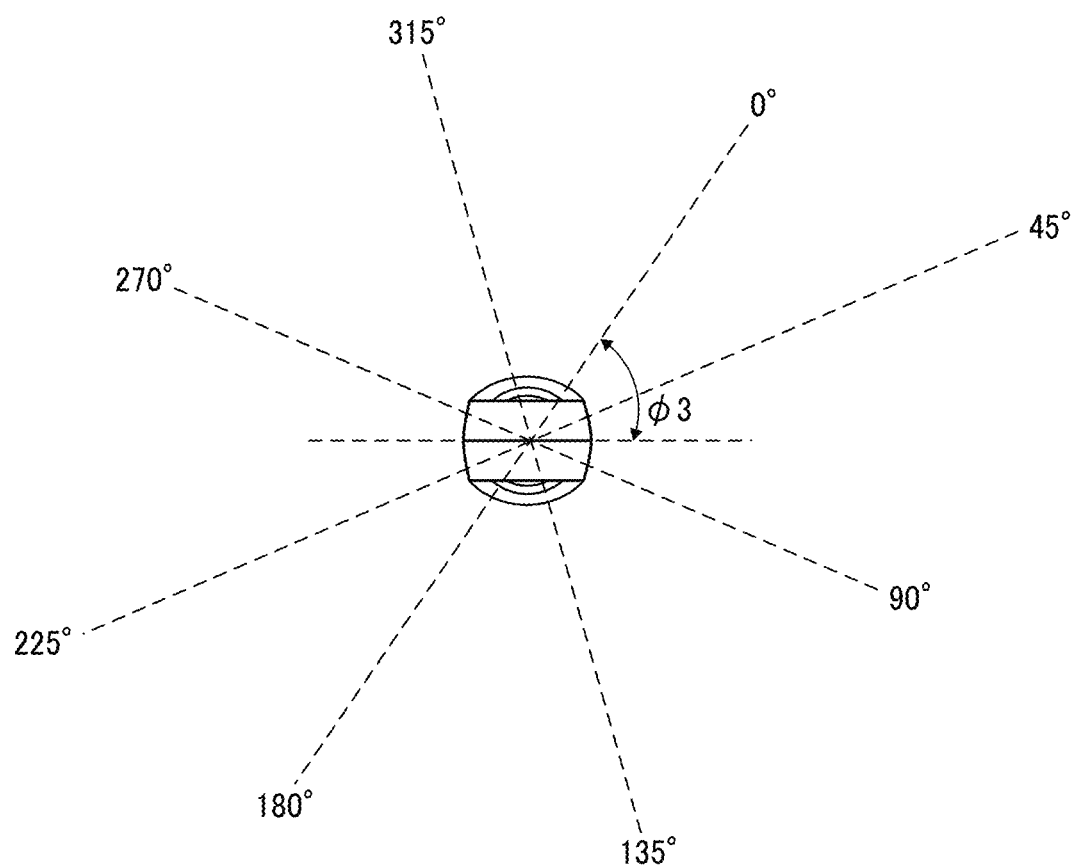
FIG. 33 is an illustration for explaining definitions of angle ranges, according to an embodiment of the present disclosure.

Referring to FIG. 33 and FIGS. 34A to 34D, a second embodiment is described. FIG. 33 is an illustration for explaining definitions of angle ranges, according to the embodiment. FIGS. 34A to 34D are views, each illustrating another display example of a predetermined-area image including display direction information, according to the embodiment. In the second embodiment, the display example is illustrated in the case where the number of other communication terminals participating in the same video communication in which the own terminal (smartphone 9) is participating is larger than that of the first embodiment. In the second embodiment, the display direction information is indicated by information representing distribution, instead of bars or arrows.

The system, hardware and functional configurations of the present embodiment are same or the substantially the same as those of the first embodiment. The present embodiment differs from the first embodiment in that processes described below are added between step S135 and step S136 in the operation illustrated in FIG. 29. With the operation to which the processes described below are added, display direction information different from the display direction information d1, d2 and d3 as illustrated in FIGS. 31A to 31D is displayed. Therefore, in the following, the added processes and the display example different from that of the first embodiment are described. The same reference numerals are given to the same or corresponding functions or configurations as those of the first embodiment, and redundant descriptions thereof are omitted or simplified appropriately.

After calculating, for each of the communication terminals in other sites, the rotation angle $\varphi 3$ of the predetermined-area image being displayed (step S135), the calculation unit 97 calculates a distribution of the calculated rotation angles $\varphi 3$ (step S135-2). More specifically, in FIG. 33, assuming that the direction of a predetermined-area image currently being displayed by the own terminal (smartphone 9) is set to 0°, the calculation unit 97 calculates, for each of preset angle ranges such as every 45 degrees, the number of the communication terminals, for which the rotation angle $\varphi 3$ is included within the preset angle range. Further, the calculation unit 97 calculates a percentage unit by dividing the number of communication terminals in each of the preset angle ranges by the total number of communication terminals. For example, when the number of communication terminals for which $\varphi 3$ is included in the angle range of 45° to 90° is 10 and the total number of communication terminals is 100, the percentage of the communication terminals displaying the predetermined-area image in the angle range from 45° to 90° is 10%. The calculation unit 97 calculates, for every preset angle range, a ratio of communication terminals displaying a predetermined-area image in the corresponding angle range. Based on the ratios calculated by the calculation unit 97, at step S136, the image and audio processor 93 generates a predetermined-area image including display direction information indicating the distribution.

Figure 34A:
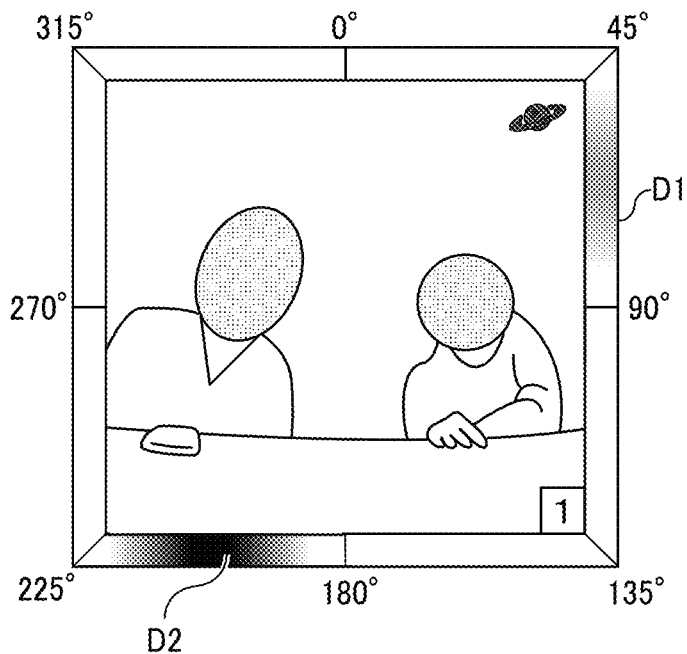
FIGS. 34A to 34D are views, each illustrating another display example of the predetermined-area image including display direction information, according to an embodiment of the present disclosure.
Figure 34B:
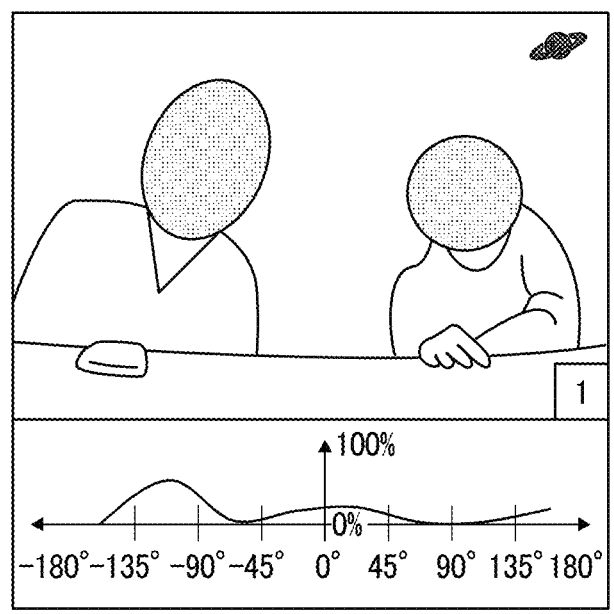
Figure 34C:
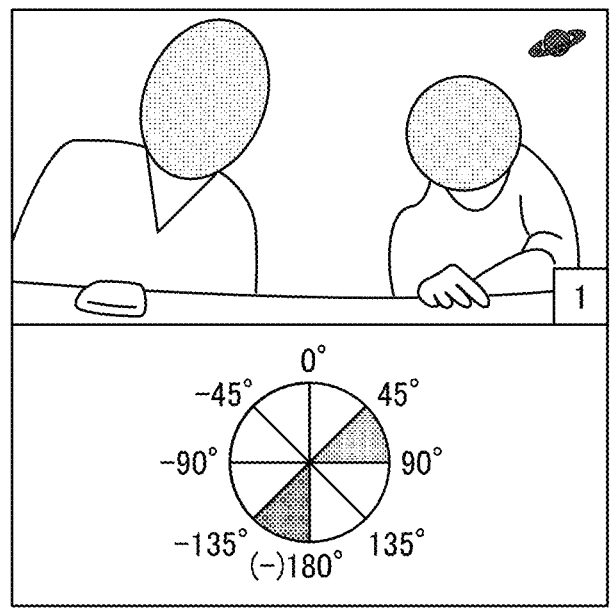
Figure 34D:
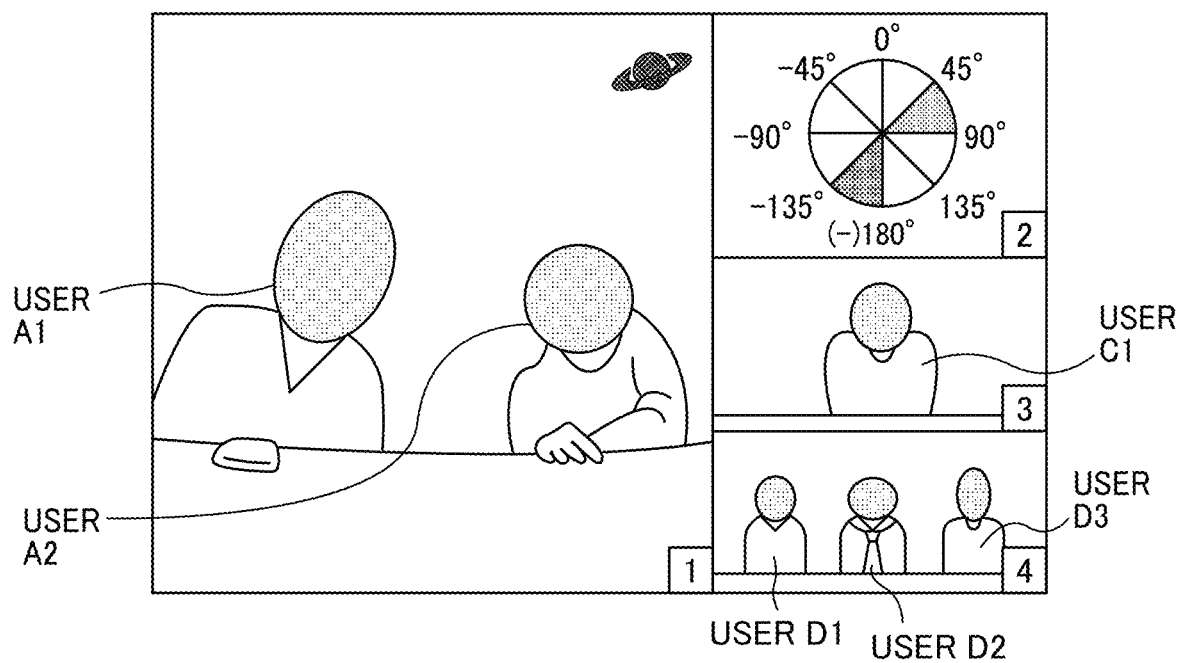

Referring to FIGS. 34A to 34D, several display examples of the display direction information indicating the distribution are described. FIGS. 34A, 34B, and 34C are views, each illustrating a display example of the predetermined-area image including display direction information, which image is displayed in the main display area. FIG. 34D is a view illustrating a display example displayed in an entire display area including the main display area and sub display areas.

FIG. 34A illustrates a fifth example of the display direction information. In the example of FIG. 34A, the display direction information is displayed around the periphery of a display area of the predetermined-area image. The display direction information D1 and D2 are expressed by gradation. The darker the gradation, the more concentrated the predetermined-area images displayed by the other communication terminals participating in the same video communication in which the smartphone 9 is participating. In the example of FIG. 34A, angles are displayed clockwise at intervals of 45 degrees. Although FIG. 34A illustrates a display example including numerical values indicating angles for the sake of explanatory convenience, such numerical values can be omitted on the display in fact. The users B1 and B2 in the site B viewing the display direction information as illustrated in FIG. 34A can recognize that the predetermined-area images being displayed by the other communication terminals are concentrated in the angle ranges where φ3 is from 45° to 90° and from 180° to 225°. Further, since the gradation of the angle range where φ3 is from 180° to 225° is darker than the gradation of the angle range where φ3 is from 45° to 90°, the users B1 and B2 in the site B can recognize that the predetermined-area images are concentrated especially in the angle range where φ3 is from 180° to 225°. Each gradation can be displayed in either color or monochrome. In the case where the gradation is to be displayed in color, 0% is displayed in blue, 1 to 50% is displayed in green, and 51 to 100% is displayed in red, for example.

FIG. 34B illustrates a sixth example of the display direction information. In FIG. 34B, the display direction information is displayed on a two-dimensional graph in a lower area of a display area for the predetermined-area image. In the example of FIG. 34B, the display direction information is expressed by a two-dimensional graph. The graph shows an angle and a percentage in horizontal and vertical axes respectively. When φ3 is greater than 180°, a value obtained by (φ3−360°) is displayed. In other words, the angle range is represented on the horizontal axis with −180° to +180°. In the example of FIG. 34B, the number of the communication terminals, each of which displays the predetermined-area image in the direction from −90° to −135°, is largest.

FIG. 34C illustrates a seventh example of the display direction information. In FIG. 34C, the display direction information is displayed on a circle graph in a lower area of a display area for the predetermined-area image. In the example of FIG. 34C, each display direction information is expressed in a form like a pie chart. The ratio is represented by gradation every angle range of 45°. The users B1 and B2 in the site B viewing the display direction information as illustrated in FIG. 34C can recognize that the predetermined-area images being displayed by the other communication terminals are concentrated in the angle ranges where φ3 is from 45° to 90° and from 180° to 225°. Further, since the gradation of the angle range where φ3 is from 180° to 225° is darker than the gradation of the angle range where φ3 is from 45° to 90°, the users B1 and B2 in the site B can recognize that the predetermined-area images are concentrated especially in the angle range where φ3 is from 180° to 225°. The pie chart can be displayed in either color or monochrome. In the case where pie chart is to be displayed in color, 0% is displayed in blue, 1 to 50% is displayed in green, and 51 to 100% is displayed in red, for example.

FIG. 34D illustrates an eighth example of the display direction information. In FIG. 34D, the pie chart illustrated in FIG. 34C is displayed in an upper-right display area (layout number 2) of the display 917, in which display area an image of the own site (site B) is to be displayed. Since the priority of viewing the image of the own site is lower than viewing the images of the other sites, the replacement of the image of the own site with another image such as an image of the circle graph is less likely to disturb the participants in the video communication from communicating with each other.

The operation described above with reference to FIG. 32 is applicable to the fifth to eighth examples of the display direction information illustrated in in FIGS. 34A to 34D, in substantially the same manner as the first to fourth examples. In this case, prior to performing the process of the above-described step S135-2, the determination unit 95 performs the process of step S152 using the rotation angle φ3 of the predetermined-area image displayed by each of the communication terminals calculated in step S135.

<<Effects of Embodiments>>

In a conventional art, if each user at each of different remote sites individually determines a desired predetermined-area image to be displayed in the same whole image, a user in a given site among the different remote sites can not recognize which part of the whole image is displayed as the predetermined-area image in other sites. Therefore, if a predetermined-area image that is not relevant to a topic of a meeting is displayed during the meeting in a given site, a problem arises that the user in this site sometimes cannot keep up with the topic of the meeting.

As described heretofore, the communication terminal, such as the videoconference terminal 3a, according to one or more of the embodiments, generates a spherical panoramic image and a predetermined-area image based on image type information associated with the image data ID transmitted with image data. This prevents the front-side hemispherical image and the back-side hemispherical image from being displayed as illustrated in FIG. 27A.

Further, a user in a given site can recognize which part of a whole image of the spherical panoramic image is displayed as the predetermined-area image in one or more of the other sites. This prevents a user from getting unable to keep up with discussion in a meeting or the like.

Further, in response to a user's operation of pressing desired display direction information or near the display direction information, the communication terminal automatically switches from a predetermined-area image currently being displayed to a desired predetermined-area image. This timely switching prevents a user from getting unable to keep up with discussion in a meeting or the like.

In the above embodiments, a captured image (whole image) is a three-dimensional spherical panoramic image, as an example of a panoramic image. In another example, the captured image is a two-dimensional panoramic image. In addition, in this disclosure, the spherical image does not have to be a full-view spherical image. For example, the spherical image can be a wide-angle view image having an angle of about 180 to 360 degrees in the horizontal direction.

Further, In the above-described embodiments, the communication management system 5 transfers the predetermined-area information transmitted from each communication terminal. In another example, each communication terminal can directly transmit or receive the predetermined-area information from or to any one or more of the other communication terminals.

Each of the functions of the above-described embodiments may be implemented by one or more processing circuits or circuitry. The processing circuitry includes a programmed processor, as a processor includes circuitry. A processing circuit also includes devices such as an application specific integrated circuit (ASIC), a digital signal processor (DSP), a field programmable gate array (FPGA), a system on a chip (SOC), a graphics processing unit (GPU), and conventional circuit components arranged to perform the recited functions.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure. Any one of the above-described operations may be performed in various other ways, for example, in an order different from the one described above.

What is claimed is:

1. A communication terminal, comprising:
    circuitry configured to:
        receive first predetermined-area information indicating a first predetermined area in a spherical panoramic image, the first predetermined-area information being transmitted from another communication terminal that displays a first predetermined-area image and the first predetermined-area image being a first image of the first predetermined-area in the spherical panoramic image;
        calculate, based on the first predetermined-area information and second predetermined-area information indicating a second predetermined area in the spherical panoramic image, a first viewing direction of the first predetermined area with respect to the second predetermined area in the spherical panoramic image; and
        control a display to display a second predetermined-area image and display direction information that indicates the first viewing direction, the second predetermined-area image being a second image of the second predetermined-area in the spherical panoramic image, wherein
        the first viewing direction is a viewing direction of a user of the another communication terminal.

2. The communication terminal of claim 1, wherein when the communication terminal receives a plurality of pieces of predetermined-area information including the first predetermined-area information from a plurality of other communication terminals including the another communication terminal, the circuitry is further configured to:
    calculate, based on the plurality of pieces of first predetermined-area information and the second predetermined-area information, viewing directions of a plurality of first predetermined-area images with respect to the second predetermined-area image in the spherical panoramic image, the plurality of pieces of first predetermined-area information indicating a plurality of first predetermined-area images being displayed by the plurality of other communication terminals; and
    control the display to further display a plurality of pieces of display direction information indicating the viewing directions.

3. The communication terminal of claim 1, wherein the display direction information is displayed at a position indicating an angle corresponding to the first predetermined-area image, around a periphery of the second predetermined-area image.

4. The communication terminal of claim 2, wherein the plurality of pieces of display direction information are displayed at positions indicating angles corresponding to the plurality of first predetermined-area images, around a periphery of the second predetermined-area image.

5. The communication terminal of claim 4, wherein the plurality of pieces of display direction information are displayed by gradation indicating distribution.

6. The communication terminal of claim 1, wherein the display direction information is displayed at a position indicating an angle corresponding to the first predetermined-area image on a one-dimensional graph.

7. The communication terminal of claim 2, wherein the plurality of pieces of display direction information are displayed at positions indicating angles corresponding to the plurality of first predetermined-area images on a one-dimensional graph.

8. The communication terminal of claim 2, wherein the plurality of pieces of display direction information is expressed by distribution of angles corresponding to the plurality of first predetermined-area images, on a two-dimensional graph.

9. The communication terminal of claim 1, wherein the display direction information is displayed at a position indicating an angle corresponding to the first predetermined-area image, on a circle graph.

10. The communication terminal of claim 2, wherein the plurality of pieces of display direction information are displayed at positions indicating angles corresponding to the plurality of first predetermined-area images, on a circle graph.

11. The communication terminal of claim 10, wherein the plurality of pieces of display direction information are displayed by gradation indicating distribution.

12. The communication terminal of claim 9, wherein the circle graph is displayed in a display area in which an image captured by the communication terminal itself is to be displayed.

13. The communication terminal of claim 1, wherein the communication terminal includes one of a videoconference terminal, a personal computer, a smartphone, a digital television, a smartwatch, and a car navigation device.

14. An image communication system, comprising:
    the communication terminal of claim 1;
    the another communication terminal; and
    a communication management system that manages communication of captured-image data between the communication terminal and the another communication terminal.

15. The communication terminal of claim 1, wherein the circuitry is further configured to transmit the second predetermined-area information to be received by the another communication terminal.

16. The communication terminal of claim 15, wherein
    the another communication terminal is configured to control a second display to display the first predetermined-area image and second display direction information that indicates a second viewing direction, and
    the second viewing direction is a viewing direction of a second user viewing the second predetermined-area image displayed by the communication terminal.

17. The communication terminal of claim 2, wherein
    the circuitry is further configured to determine, in response to accepting designation of an area where any one of the plurality of pieces of display direction information are displayed, that designation of a particular one of the plurality of pieces of display direction information is accepted, and
    the particular one is closest to the area for which the designation is accepted.

18. The communication terminal of claim 1, wherein the spherical panoramic image is captured by a 360-degree camera.

19. A display control method performed by a communication terminal, the method comprising:
receiving, by the communication terminal, first predetermined-area information indicating a first predetermined area in a spherical panoramic image, the first predetermined-area information being transmitted from another communication terminal that displays a first predetermined-area image and the first predetermined-area image being a first image of the first predetermined-area in the spherical panoramic image;
calculating, based on the first predetermined-area information and second predetermined-area information indicating a second predetermined area in the spherical panoramic image, a first viewing direction of the first predetermined area with respect to the second predetermined area in the spherical panoramic image; and
controlling a display to display a second predetermined-area image and display direction information that indicates the first viewing direction, the second predetermined-area image being a second image of the second predetermined-area in the spherical panoramic image, wherein
the first viewing direction is a viewing direction of a user of the another communication terminal.

20. A non-transitory computer-readable medium storing a computer-executable program that, when executed by a communication terminal, causes the communication terminal, to perform a method comprising:
receiving first predetermined-area information indicating a first predetermined area in a spherical panoramic image, the first predetermined-area information being transmitted from another communication terminal that displays a first predetermined-area image and the first predetermined-area image being a first image of the first predetermined-area in the spherical panoramic image;
calculating, based on the first predetermined-area information and second predetermined-area information indicating a second predetermined area in the spherical panoramic image, a first viewing direction of the first predetermined area with respect to the second predetermined area in the spherical panoramic image; and
controlling a display to display a second predetermined-area image and display direction information that indicates the first viewing direction, the second predetermined-area image being a second image of the second predetermined-area in the spherical panoramic image, wherein
the first viewing direction is a viewing direction of a user of the another communication terminal.

* * * * *